US008609745B2

(12) United States Patent
Medina et al.

(10) Patent No.: US 8,609,745 B2
(45) Date of Patent: Dec. 17, 2013

(54) PRODUCTION OF OPHTHALMIC DEVICES BASED ON PHOTO-INDUCED STEP GROWTH POLYMERIZATION

(71) Applicant: Novartis AG, Basel (CH)

(72) Inventors: Arturo Norberto Medina, Suwanee, GA (US); Dawn Alison Smith, Rotorua (NZ); Robert Scott, Alpharetta, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 13/711,655

(22) Filed: Dec. 12, 2012

(65) Prior Publication Data

US 2013/0106007 A1 May 2, 2013

Related U.S. Application Data

(62) Division of application No. 13/182,969, filed on Jul. 14, 2011, now Pat. No. 8,357,771, which is a division of application No. 12/001,562, filed on Dec. 12, 2007, now Pat. No. 8,003,710.

(60) Provisional application No. 60/869,812, filed on Dec. 13, 2006.

(51) Int. Cl.
G02B 1/04 (2006.01)
C08F 290/04 (2006.01)

(52) U.S. Cl.
USPC ........... 523/107; 523/106; 526/242; 526/246; 526/258; 526/263; 526/279; 526/307.1; 526/318.1; 526/320; 526/322; 526/327

(58) Field of Classification Search
None
See application file for complete search history.

(56) References Cited

U.S. PATENT DOCUMENTS

| | | | |
|---|---|---|---|
| 3,408,429 A | 10/1968 | Wichterle | |
| 3,549,747 A | 12/1970 | Krezanoski et al. | 424/78 |
| 3,639,576 A | 2/1972 | Kaspar et al. | 424/78 |
| 3,882,036 A | 5/1975 | Krezanoski et al. | 252/106 |
| 4,013,576 A | 3/1977 | Loshaek | 252/106 |
| 4,287,175 A | 9/1981 | Katz | 424/78 |
| 4,312,575 A | 1/1982 | Peyman et al. | 351/160 H |
| 4,323,467 A | 4/1982 | Fu | 252/106 |
| 4,347,198 A | 8/1982 | Ohkada | |
| 4,444,711 A | 4/1984 | Schad | 264/243 |
| 4,460,534 A | 7/1984 | Boehm et al. | 264/246 |
| 4,486,577 A | 12/1984 | Mueller | |
| 4,500,441 A | 2/1985 | Tanaka et al. | 252/89.1 |
| 4,529,535 A | 7/1985 | Sherman | 252/106 |
| 4,536,554 A | 8/1985 | Lim et al. | 526/264 |
| 4,551,461 A | 11/1985 | Sherman | 514/275 |
| 4,560,491 A | 12/1985 | Sherman | 252/106 |
| 4,568,517 A | 2/1986 | Kaspar et al. | 422/30 |
| 4,626,292 A | 12/1986 | Sherman | 134/26 |
| 4,632,844 A | 12/1986 | Yanagihara et al. | 427/488 |
| 4,746,514 A | 5/1988 | Warne | 424/445 |
| 4,783,488 A | 11/1988 | Ogunbiyi et al. | 514/635 |
| 4,786,436 A | 11/1988 | Ogunbiyi et al. | 252/352 |
| 4,969,998 A | 11/1990 | Henn | |
| 4,983,702 A | 1/1991 | Mueller et al. | 528/28 |
| 5,008,356 A | 4/1991 | Ishimaru et al. | 526/281 |
| 5,036,971 A | 8/1991 | Seden et al. | 206/5.1 |
| 5,079,319 A | 1/1992 | Mueller | |
| 5,087,392 A | 2/1992 | Burke et al. | 264/2.7 |
| 5,087,677 A | 2/1992 | Brekner et al. | 526/160 |
| 5,141,665 A | 8/1992 | Sherman | 252/106 |
| 5,157,093 A | 10/1992 | Harisiades et al. | 527/301 |
| 5,198,477 A | 3/1993 | von der Haegen et al. | 523/106 |
| 5,260,001 A | 11/1993 | Nandu et al. | 264/2.1 |
| 5,322,667 A | 6/1994 | Sherman | 422/28 |
| 5,364,601 A | 11/1994 | Salpekar | 422/28 |
| 5,382,599 A | 1/1995 | Rupp et al. | 514/547 |
| 5,405,878 A | 4/1995 | Ellis et al. | 422/28 |
| 5,500,144 A | 3/1996 | Potini et al. | 252/174.15 |
| 5,508,317 A | 4/1996 | Muller | 522/85 |
| 5,527,925 A | 6/1996 | Chabrecek | |
| 5,583,163 A | 12/1996 | Müller | |
| 5,583,463 A | 12/1996 | Merritt | 327/526 |
| 5,604,189 A | 2/1997 | Zhang et al. | 510/112 |
| 5,612,389 A | 3/1997 | Chabrecek | |
| 5,612,391 A | 3/1997 | Chabrecek | |
| 5,621,018 A | 4/1997 | Chabrecek | |
| 5,656,210 A | 8/1997 | Hill et al. | 264/2.6 |
| 5,665,840 A | 9/1997 | Pohlmann et al. | 526/264 |
| 5,711,823 A | 1/1998 | Ellis et al. | 134/42 |

(Continued)

FOREIGN PATENT DOCUMENTS

| | | | |
|---|---|---|---|
| EP | 0315836 | 6/1989 | ........... C08L 101/00 |
| EP | 0958315 B1 | 6/2001 | |
| EP | 0932635 B1 | 7/2001 | |
| EP | 0961941 B1 | 4/2002 | |
| WO | WO 95/00618 | 1/1995 | ............... C11D 3/00 |
| WO | WO 95/34327 | 12/1995 | ............... A61L 2/00 |
| WO | WO 97/20019 | 6/1997 | ............... C11D 3/00 |
| WO | 0031150 A1 | 6/2000 | |
| WO | WO 01/34312 | 5/2001 | ............... B05D 5/06 |
| WO | 0171392 A1 | 9/2001 | |
| WO | WO 2005/011966 | 2/2005 | ............. B29D 11/00 |

OTHER PUBLICATIONS

Cramer et al., Mechanism and Modeling of a Thiol-Ene Photopolymerization, Macromolecules, 2003, vol. 36, pp. 4631-4636.
Cramer et al., Photopolymerizations of Thiol-Ene Polymers without Photoinitiators, Macromolecules, 2002, vol. 35, pp. 5361-5365.
Cramer et al., Thiol-Ene Photopolymerization Mechanism and Rate Limiting Step Changes for Various Vinyl Functional Group Chemistries, Macromolecules, 2003, vol. 36, pp. 7964-7969.
Evans et al., Free-Radical Ring-Opening Polymerizatino of Cyclic Allylic Sulfides, Macromolecules, 1996, vol. 29, pp. 6983-6989.

(Continued)

Primary Examiner — Marc Zimmer
(74) Attorney, Agent, or Firm — Jian Zhou

(57) ABSTRACT

The invention provide a new lens curing method for making hydrogel contact lenses. The new lens curing method is based on actinically-induced step-growth polymerization. The invention also provides hydrogel contact lenses prepared from the method of the invention and fluid compositions for making hydrogel contact lenses based on the new lens curing method. In addition, the invention provide prepolymers capable of undergoing actinically-induced step-growth polymerization to form hydrogel contact lenses.

10 Claims, No Drawings

(56) References Cited

U.S. PATENT DOCUMENTS

| | | | |
|---|---|---|---|
| 5,712,356 A | 1/1998 | Bothe et al. ............... 526/264 |
| 5,726,733 A | 3/1998 | Lai et al. ................. 351/160 |
| 5,731,087 A | 3/1998 | Fan et al. ................. 428/412 |
| 5,760,100 A | 6/1998 | Nicolson et al. ........... 523/106 |
| 5,773,396 A | 6/1998 | Zhang et al. .............. 510/115 |
| 5,789,464 A | 8/1998 | Muller .................... 523/108 |
| 5,800,412 A | 9/1998 | Zhang et al. .............. 604/280 |
| 5,807,636 A | 9/1998 | Sheu et al. ............... 428/403 |
| 5,837,377 A | 11/1998 | Sheu et al. ............... 428/412 |
| 5,843,346 A | 12/1998 | Morrill ................... 264/2.5 |
| 5,849,810 A | 12/1998 | Müller |
| 5,849,841 A | 12/1998 | Muhlebach et al. .......... 525/59 |
| 5,872,086 A | 2/1999 | Ellis et al. .............. 510/112 |
| 5,882,687 A | 3/1999 | Park et al. ............... 424/682 |
| 5,894,002 A | 4/1999 | Boneberger et al. ......... 264/1.36 |
| 5,936,052 A | 8/1999 | Bothe et al. .............. 526/264 |
| 5,942,558 A | 8/1999 | Korb ...................... 523/106 |
| 5,998,498 A | 12/1999 | Vanderlaan et al. ......... 523/107 |
| 6,037,328 A | 3/2000 | Hu et al. ................. 514/23 |
| 6,039,913 A | 3/2000 | Hirt et al. ............... 264/331.11 |
| 6,165,408 A | 12/2000 | Steinmann ................. 264/496 |
| 6,193,369 B1 | 2/2001 | Valint, Jr. et al. ........ 351/160 H |
| 6,207,628 B1 | 3/2001 | Soyer et al. .............. 510/112 |
| 6,221,303 B1 | 4/2001 | Steinmann ................. 264/496 |
| 6,265,509 B1 | 7/2001 | Müller |
| 6,274,133 B1 | 8/2001 | Hu et al. ................. 424/78.04 |
| 6,303,687 B1 | 10/2001 | Muller .................... 252/61 |
| 6,348,507 B1 | 2/2002 | Heiler et al. ............. 514/769 |
| 6,367,929 B1 | 4/2002 | Maiden et al. ............. 351/160 H |
| 6,428,839 B1 | 8/2002 | Kunzler et al. ............ 427/2.1 |
| 6,440,366 B1 | 8/2002 | Salpekar et al. ........... 422/40 |
| 6,451,871 B1 | 9/2002 | Winterton et al. .......... 523/106 |
| 6,472,489 B1 | 10/2002 | Stockinger ................ 526/312 |
| 6,479,587 B1 | 11/2002 | Stockinger et al. ......... 525/131 |
| 6,482,799 B1 | 11/2002 | Tuse et al. ............... 514/14 |
| 6,492,478 B1 | 12/2002 | Steinmann ................. 526/278 |
| 6,528,048 B1 | 3/2003 | Koike et al. .............. 424/78.17 |
| 6,531,432 B2 | 3/2003 | Molock et al. ............. 510/112 |
| 6,589,665 B2 | 7/2003 | Chabrecek et al. .......... 428/520 |
| 6,617,291 B1 | 9/2003 | Smith ..................... 510/112 |
| 6,627,124 B1 | 9/2003 | Herbrechtsmeier et al. .... 264/1.36 |
| 6,630,243 B2 | 10/2003 | Valint, Jr. et al. ........ 428/420 |
| 6,634,748 B1 | 10/2003 | Vanderlaan et al. ......... 351/177 |
| 6,686,330 B2 | 2/2004 | Jordan, IV et al. ......... 510/475 |
| 6,689,480 B2 | 2/2004 | Shimoyama et al. .......... 428/451 |
| 6,699,435 B2 | 3/2004 | Salpekar et al. ........... 422/40 |
| 6,702,983 B2 | 3/2004 | Hu et al. ................. 422/1 |
| 6,719,929 B2 | 4/2004 | Winterton et al. .......... 264/1.7 |
| 6,759,491 B2 | 7/2004 | Matyjaszewski et al. ...... 526/90 |
| 6,793,973 B2 | 9/2004 | Winterton et al. .......... 427/393.5 |
| 6,805,836 B2 | 10/2004 | Salamone et al. ........... 422/1 |
| 6,811,805 B2 | 11/2004 | Gilliard et al. ........... 427/2.1 |
| 6,815,074 B2 | 11/2004 | Aguado et al. ............. 428/447 |
| 6,822,016 B2 | 11/2004 | McCabe et al. ............. 523/107 |
| 6,827,966 B2 | 12/2004 | Qiu et al. ................ 427/2.24 |
| 6,849,671 B2 | 2/2005 | Steffen et al. ............ 523/107 |
| 6,852,353 B2 | 2/2005 | Qiu et al. ................ 427/2.24 |
| 6,867,172 B2 | 3/2005 | Alvarez et al. ............ 510/112 |
| 6,893,685 B2 | 5/2005 | Qiu et al. ................ 427/407.1 |
| 6,896,926 B2 | 5/2005 | Qiu et al. ................ 427/2.31 |
| 6,902,812 B2 | 6/2005 | Valint, Jr. et al. ........ 428/420 |
| 6,926,965 B2 | 8/2005 | Qiu et al. ................ 428/411.1 |
| 6,943,203 B2 | 9/2005 | Vanderlaan et al. ......... 523/107 |
| 6,995,192 B2 | 2/2006 | Phelan et al. ............. 522/90 |
| 7,052,131 B2 | 5/2006 | McCabe et al. ............. 351/160 |
| 7,091,283 B2 | 8/2006 | Muller et al. ............. 525/292 |
| 7,165,839 B2 | 1/2007 | Winterton et al. .......... 351/177 |
| 7,238,750 B2 | 7/2007 | Muller et al. ............. 525/292 |
| 7,247,692 B2 | 7/2007 | Laredo .................... 526/279 |
| 7,268,189 B2 | 9/2007 | Muller et al. ............. 525/292 |
| 7,279,507 B2 | 10/2007 | Hu et al. ................. 523/108 |
| 7,329,415 B2 | 2/2008 | Lally et al. .............. 424/429 |
| 7,364,723 B1 | 4/2008 | Nakada et al. ............. 424/78.04 |
| 7,371,804 B2 | 5/2008 | Jethmalani |
| 7,744,912 B1 | 6/2010 | Hubbell |
| 7,858,000 B2 | 12/2010 | Winterton |
| 8,003,710 B2 | 8/2011 | Medina |
| 2001/0037001 A1 | 11/2001 | Muller |
| 2001/0044482 A1 | 11/2001 | Hu et al. ................. 523/106 |
| 2002/0076443 A1 | 6/2002 | Stein |
| 2002/0115578 A1 | 8/2002 | Groemminger .............. 510/112 |
| 2002/0115740 A1 | 8/2002 | Beuhler |
| 2002/0182315 A1 | 12/2002 | Heiler et al. ............. 427/162 |
| 2003/0052424 A1 | 3/2003 | Turner et al. ............. 264/1.32 |
| 2003/0095230 A1 | 5/2003 | Neely et al. .............. 351/159 |
| 2003/0096717 A1 | 5/2003 | Xia et al. ................ 510/112 |
| 2003/0117579 A1 | 6/2003 | Morris et al. ............. 351/200 |
| 2003/0144373 A1 | 7/2003 | Bowman |
| 2004/0028645 A1 | 2/2004 | Chowhan .................. 424/78.27 |
| 2004/0082052 A1 | 4/2004 | Brown et al. .............. 435/196 |
| 2004/0082680 A1 | 4/2004 | Phelan |
| 2004/0086479 A1 | 5/2004 | Grinstaff |
| 2004/0115270 A1 | 6/2004 | Jani et al. ............... 424/486 |
| 2004/0119176 A1 | 6/2004 | Xia et al. ................ 264/1.32 |
| 2004/0120982 A1 | 6/2004 | Diana et al. .............. 424/429 |
| 2004/0135967 A1 | 7/2004 | Carney et al. ............. 351/159 |
| 2004/0156880 A1 | 8/2004 | Ravi |
| 2004/0186248 A1 | 9/2004 | Vanderlaan et al. ......... 525/474 |
| 2005/0006255 A1 | 1/2005 | Peck et al. ............... 206/5.1 |
| 2005/0008676 A1 | 1/2005 | Qiu et al. ................ 424/429 |
| 2005/0013842 A1 | 1/2005 | Qiu et al. ................ 424/423 |
| 2005/0047270 A1 | 3/2005 | Wood et al. ............... 366/170.3 |
| 2005/0058844 A1 | 3/2005 | Rubner et al. ............. 428/457 |
| 2005/0085591 A1 | 4/2005 | Dozeman et al. ............ 525/192 |
| 2005/0113549 A1 | 5/2005 | Devlin et al. ............. 528/44 |
| 2005/0117112 A1 | 6/2005 | Nayiby et al. ............. 351/160 R |
| 2005/0153056 A1 | 7/2005 | Winterton et al. .......... 427/2.1 |
| 2005/0154080 A1 | 7/2005 | McCabe et al. ............. 523/107 |
| 2005/0202549 A1 | 9/2005 | Brown et al. .............. 435/196 |
| 2006/0001184 A1 | 1/2006 | Phelan et al. ............. 264/1.32 |
| 2006/0052547 A1 | 3/2006 | Jethmalani |
| 2006/0063852 A1 | 3/2006 | Iwata et al. .............. 523/106 |
| 2006/0073185 A1 | 4/2006 | Jani et al. ............... 424/427 |
| 2006/0142169 A1 | 6/2006 | Smith ..................... 510/112 |
| 2006/0204582 A1 | 9/2006 | Stein |
| 2007/0010595 A1 | 1/2007 | McCabe et al. ............. 523/106 |
| 2007/0015205 A1 | 1/2007 | Brown et al. .............. 435/7.1 |
| 2007/0043140 A1 | 2/2007 | Lorenz et al. ............. 523/106 |
| 2007/0098818 A1 | 5/2007 | Smith ..................... 424/680 |
| 2008/0015315 A1 | 1/2008 | Chang et al. .............. 525/326.9 |
| 2008/0021127 A1 | 1/2008 | Muller et al. ............. 522/99 |
| 2008/0045612 A1 | 2/2008 | Rathore et al. ............ 516/102 |
| 2008/0167246 A1 | 7/2008 | Smith et al. .............. 514/13 |
| 2008/0174035 A1 | 7/2008 | Winterton ................. 264/1.36 |

OTHER PUBLICATIONS

Evans et al., Free-Radical Ring-Opening Polymerization of Cyclic Allylic Sulfides. 2. Effect of Substituents on Seven- and Eight-Membered Ring Low Shrink Monomers, Macromolecules, 2000, vol. 33, pp. 6722-6731.

Evans et al., New Free-Radical Ring-Opening Acrylate Monomers, Macromolecules, 1994, vol. 27, pp. 7935-7937.

Naciri et al., Molecular Structure and Pretilt Control of Photodimerized-Monolayers (PDML), Journal of Materials Chemistry, 2004, vol. 14, pp. 3468-3473.

Norbornene Technical Data Sheet, 2002, 6 pages.

Okay et al., Molecular Weight Development During Thiol-Ene Photopolymerizations, Macromolcules, 2005, vol. 38, pp. 4501-4511.

Promerus LLC Electronic Materials Technology Tutorial on the Chemistry of Norbornene Monomers and Polymers, Polymerizatio Reactions, and Key Product Application Areas, 19 pages.

Scott et al., Photoinduced Plasticity in Cross-Linked Polymers, Science, 2005, vol. 308, pp. 1615-1617.

Authors: Bo Qiu, Simon Stefanos, Jianglin Ma, Anita Lalloo, Barbara A Perry, Michael J Leibowitz, Patrick J Sinko; Stanley Stein Article: A hydrogel prepared by in situ cross-linking of a thiol-containing poly(ethylene glycol)-based copolymer: a new biomaterial for protein drug delivery. Published: Biomaterials 2003; vol. 24, pp. 11-18.

PRODUCTION OF OPHTHALMIC DEVICES BASED ON PHOTO-INDUCED STEP GROWTH POLYMERIZATION

This application is a divisional application of application Ser. No. 13/182,969 filed Jul. 14, 2011, which is a divisional application of application Ser. No. 12/001,562, filed Dec. 12, 2007, now U.S. Pat. No. 8,003,710, which claims the benefits under 35 USC 119(e) of the U.S. Provisional Patent Application No. 60/869,812 filed Dec. 13, 2006 herein incorporated by reference in its entirety.

The present invention is related to a method for making ophthalmic devices, in particular hydrogel contact lenses. In particular, the present invention is related to a method for cast-molding of hydrogel contact lenses based on photo-induced step growth polymerization. In addition, the present invention is related to actinically crosslinkable prepolymers and compositions useful for making polymeric articles, preferably ophthalmic device, more preferably soft hydrogel contact lenses.

BACKGROUND

A great effort has been made to develop technologies for cast molding of hydrogel contact lenses with high precision, fidelity and reproducibility and at low cost. One of such manufacturing technologies is the so-called Lightstream Technology™ (CIBA Vision) involving a lens-forming composition being substantially free of monomers and comprising a substantially purified prepolymer with ethylenically-unsaturated groups, reusable molds, and curing under a spatial limitation of actinic radiation (e.g., UV), as described in U.S. Pat. Nos. 5,508,317, 5,583,463, 5,789,464, and 5,849,810. The Lightstream Technology™ for making contact lenses have several advantages. First, the curing process is fast, at a time scale of seconds. Fast curing can ensure design and adaptation of a high speed, continuous and automatic lens production involving on-line lens curing. Second, by using a composition comprising a prepolymer and being substantially free of monomers, subsequent extraction steps (removing unpolymerized monomers from the lenses) required in a traditional cast-molding manufacturing process are eliminated. Without lens extraction, the production cost can be reduced and the production efficiency can be further enhanced. Third, reusable quartz/glass molds or reusable plastic molds, not disposable plastic molds, can be used, because, following the production of a lens, these molds can be cleaned rapidly and effectively of the uncrosslinked prepolymer and other residues, using a suitable solvent and can be blown dried with air. Disposable plastic molds inherently have variations in the dimensions, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design. By using reusable molds which are produced in high precision, one can eliminate dimensional variations inherently presented in disposable molds and thereby variation in contact lenses produced therefrom. Lenses produced according to the Lightstream Technology™ can have high consistency and high fidelity to the original lens design.

However, there are some practical limitations which hinder realization of all of the great potentials of such technology. For example, a lens-forming composition may need to have relatively low viscosity so as to dispense the composition into molds at a high speed. To have a relatively low viscosity, a prepolymer in the composition may have to have a relatively lower molecular mass. It is believed that the molecular mass of a prepolymer may affect the mechanical strength of lenses made from crosslinking of the prepolymer. Lenses made from crosslinking of a prepolymer with a low molecular mass may not have a desired mechanical strength, such as, for example, low tearing resistance. Hydrogel contact lenses having low mechanical strength may not be suitable for daily- and extended-wear modality.

Accordingly, there is still a need for a lens manufacturing process for economically producing durable, highly elastic soft contact lenses with desired physical properties. There is also need for new actinically-crosslinkable prepolymers suitable for making hydrogel contact lenses with desired mechanical strength and desired physical properties.

SUMMARY OF THE INVENTION

In accomplishing the foregoing, there is provided, in accordance with one aspect of the present invention, a method for producing contact lenses. The method comprises the steps of: (1) obtaining a fluid composition, wherein the composition comprises at least one prepolymer having multiple first propagating groups each capable of undergoing photo-induced step-growth polymerization in the presence of or in the absence of a step-growth-propagating agent having two or more second propagating groups each co-reactive with one of the first propagating group in a photo-induced step-growth polymerization to form a hydrogel material; (2) introducing the fluid composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and (3) actinically irradiating or thermally curing the composition in the mold to crosslink said at least one prepolymer to form the contact lens.

In another aspect, the invention provides a soft hydrogel contact lens. The contact lens of the invention is obtained by polymerization of a fluid composition, wherein the composition comprises at least one prepolymer having multiple first propagating groups each capable of undergoing photo-induced step-growth polymerization in the presence of or in the absence of a step-growth-crosslinking agent having two or more second propagating groups each capable of reacting with one of the first propagating group in a photo-induced step-growth polymerization, provided that the composition is substantially free of any vinylic monomer.

In a further aspect, the invention provides a prepolymer suitable for making soft hydrogel contact lenses. The prepolymer of the invention comprises multiple first propagating groups each capable of undergoing photo-induced step-growth polymerization in the presence of or in the absence of second propagating groups co-reactive with the first propagating group in a photo-induced step-growth polymerization, wherein the prepolymer is capable of being crosslinked under actinic irradiation to form a hydrogel material in the absence of any vinylic monomer and/or any compound having from two to eight acryloyl or methacryloyl groups and having a molecular weight of less than 700 Daltons.

In still a further aspect, the invention provides a fluid composition for making medical devices, preferably ophthalmic device, more preferably soft hydrogel contact lenses. The fluid composition of the invention comprises at least one prepolymer having multiple first propagating groups each capable of undergoing photo-induced step-growth polymerization in the presence of or in the absence of a step-growth-crosslinking agent having two or more second propagating groups each co-reactive with one of the first propagating group in a photo-induced step-growth polymerization, wherein the composition is characterized by having a low viscosity and being capable of undergoing photo-induced step-growth polymerization to crosslink the prepolymer to form a hydrogel material, provided that the composition is substantially free of any vinylic monomer.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylentically unsaturated group" is employed herein in a broad sense and is intended to encompass any groups containing at least one >C=C< group which is directly linked to a carbonyl group (—CO—), a benzene ring, nitrogen atom, or oxygen atom. Exemplary ethylenically unsaturated groups include without limitation acryloyl, methacryloyl, styrenyl, vinyl carbamate group, vinyl lactam group.

A vinyl lactam has a formula of

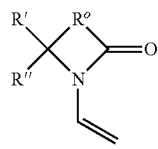

which $R^o$ is an alkylene divalent radical having from 2 to 8 carbon atoms, $R'$ is hydrogen, alkyl, aryl, aralkyl or alkaryl, preferably hydrogen or lower alkyl having up to 7 and, more preferably, up to 4 carbon atoms, such as, for example, methyl, ethyl or propyl; aryl having up to 10 carbon atoms, and also aralkyl or alkaryl having up to 14 carbon atoms; and $R''$ is hydrogen, or lower alkyl having up to 7 and, more preferably, up to 4 carbon atoms, such as, for example, methyl, ethyl or propyl.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic monomer", as used herein, refers to a monomer which can be polymerized to form a homopolymer that can absorb at least 10 percent by weight water.

A "hydrophobic monomer", as used herein, refers to a monomer which can be polymerized to form a homopolymer that is insoluble in water and can absorb less than 10 percent by weight water.

A "macromer" refers to a medium and high molecular weight compound or polymer that contains at least one actinically-crosslinkable group and can be polymerized and/or crosslinked to form a polymer. Medium and high molecular weight typically means average molecular weights greater than 700 Daltons.

A "prepolymer" refers to a starting polymer which can be cured (e.g., crosslinked and/or polymerized) actinically or thermally or chemically to obtain a crosslinked polymer having a molecular weight much higher than the starting polymer.

A "silicone-containing prepolymer" refers to a prepolymer which contains silicone and can be crosslinked to obtain a crosslinked polymer having a molecular weight much higher than the starting polymer.

A "polymer" means a material formed by polymerizing/crosslinking one or more monomers, one or more macromers, one or more prepolymers, or mixtures thereof.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatial limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

The term "fluid" as used herein indicates that a material is capable of flowing like a liquid.

"Surface modification", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929, 6,822,016, 7,279,507 (herein incorporated by references in their entireties), reinforced mold-transfer coating disclosed in commonly-owned copending U.S. patent application Ser. No. 11/810,601 (herein incorporated by reference in its entirety), and LbL coating. A preferred class of surface treatment processes are plasma processes, in which an ionized gas is applied to the surface of an article. Plasma gases and processing conditions are described more fully in U.S. Pat. Nos. 4,312,575 and 4,632,844, which are incorporated herein by reference. The plasma gas is preferably a mixture of lower alkanes and nitrogen, oxygen or an inert gas.

"LbL coating", as used herein, refers to a coating that is not covalently attached to a contact lens or a mold half and is obtained through a layer-by-layer ("LbL") deposition of polyionic (or charged) and/or non-charged materials on the lens or mold half. An LbL coating can be composed of one or more layers.

As used herein, a "polyionic material" refers to a polymeric material that has a plurality of charged groups or ionizable groups, such as polyelectrolytes, p- and n-type doped conducting polymers. Polyionic materials include both polycationic (having positive charges) and polyanionic (having negative charges) materials.

The term "bilayer" is employed herein in a broad sense and is intended to encompass: a coating structure formed on a contact lens or a mold half by alternatively applying, in no particular order, one layer of a first polyionic material (or charged material) and subsequently one layer of a second polyionic material (or charged material) having charges opposite of the charges of the first polyionic material (or the charged material); or a coating structure formed on a contact lens or mold half by alternatively applying, in no particular order, one layer of a first charged polymeric material and one layer of a non-charged polymeric material or a second charged polymeric material. It should be understood that the layers of the first and second coating materials (described above) may be intertwined with each other in the bilayer.

Formation of an LbL coating on a contact lens or mold half may be accomplished in a number of ways, for example, as described in U.S. Pat. Nos. 6,451,871, 6,719,929, 6,793,973, 6,811,805, 6,896,926 (herein incorporated by references in their entireties).

An "innermost layer", as used herein, refers to the first layer of an LbL coating, which is applied onto the surface of a contact lens or mold half.

A "capping layer" or "outmost layer", as used herein, refers to the last layer or the sole layer of an LbL coating which is applied onto a contact lens or mold half.

An "average contact angle" refers to a water contact angle (advancing angle measured by Wilhelmy Plate method), which is obtained by averaging measurements of at least 3 individual contact lenses.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

"Stabilized antimicrobial metal nanoparticles" refer to antimicrobial metal nanoparticles which are stabilized by a stabilizer during their preparation. Stabilized antimicrobial metal nano-particles can be either positively charged or negatively charged or neutral, largely depending on a material (or so-called stabilizer) which is present in a solution for preparing the nano-particles and can stabilize the resultant nano-particles. A stabilizer can be any known suitable material. Exemplary stabilizers include, without limitation, positively charged polyionic materials, negatively charged polyionic materials, polymers, surfactants, salicylic acid, alcohols and the like.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3 \text{ oxygen})/(cm^2)(sec)(mm^2 \text{ Hg})] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3 \text{ oxygen})(mm)/(cm^2)(sec)(mm^2 \text{ Hg})] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm $$\left(\frac{90 \times 10^{-10}}{0.09} = 100 \times 10^{-9}\right)$$

(oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where
n'=rate of ion transport [mol/min]
A=area of lens exposed [$mm^2$]
D=Ionoflux Diffusion Coefficient [$mm^2$/min]
dc=concentration difference [mol/L]
dx=thickness of lens [mm]

The Ionoton Ion Permeability Coefficient, P, is then determined in accordance with the following equation:

$$\ln(1 - 2C(t)/C(0)) = -2APt/Vd$$

where:
C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5 \times 10^{-6}$ $mm^2$/min is preferred, while greater than about $2.6 \times 10^{-6}$ $mm^2$/min is more preferred and greater than about $6.4 \times 10^{-6}$ $mm^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

In general, the invention is directed to a method for economically producing durable, highly elastic hydrogel contact lenses with desired mechanical and physical properties. The invention is partly based on the discovery that a new lens curing method based on step-growth polymerization, different from current curing method used in contact lenses industry, can be advantageously and directly used in cast-molding of hydrogel contact lenses with desirable mechanical and physical properties. Such new lens curing mechanism can overcome shortcomings of conventional lens-curing mechanism based on free radical chain-growth polymerization. For example, although free radical chain-growth polymerization is rapid, molecular mass between crosslinks may be quite low and the resultant polymer may have undesirably high E-modulus, low tearing resistance, and/or other non-optimal mechanical or physical properties. It is believed that molecular mass between crosslinks is generally dictated by the molecular mass of starting macromer or prepolymer. As such, in order to enhance the mechanical properties (e.g., tear resistance) of contact lenses, prepolymers with high molecular mass have to be used in compositions for making contact lenses based on free radical chain-growth polymerization. But, prepolymers with high molecular mass will inevitably increase greatly the viscosity of the polymerizable composition and thereby the processing ability (e.g., dosing in molds) of the polymerizable composition is greatly hindered. In addition, resultant polymers form at near-zero monomer conversion because of the chain-growth nature of the polymerization, leading very high viscosity at low conversion and inducing stress in the formed network of a hydrogel.

However, it is discovered here that lens curing method based on photo-induced step growth polymerization can have advantages over traditional lens curing method (i.e., free radical chain-growth polymerization). First, the photo-induced step-growth polymerization can be rapid, e.g., in a timescale of seconds. Such lens curing can be easily implemented in the Lightstream Technology™. Second, it is believed that under step-growth polymerization, each chain end reacts with only one other chain end, leading to buildup of molecular mass between crosslinks. With high molecular mass between crosslinks, the mechanical strength, such as, e.g., tear resistance or the like, can be expectedly enhanced. Third, it is believed that because resultant polymers form at high conversion of monomers, the viscosity of the reaction system remains low until high conversion and polymerization would induce lower stress in the network of a hydrogel. Prepolymers having relatively lower molecular mass can be used to produce contact lenses with desirable mechanical properties. The viscosity of a polymerizable composition with such prepolymers can be relatively low. Fourth, step-growth polymerization can be used in combination with free radical chain-growth polymerization to provide a polymerizable composition tailorable for a wide range of mechanical and physical properties.

The present invention, in one aspect, provides a method for producing contact lenses. The method of the invention comprises the steps of: (1) obtaining a fluid composition, wherein the composition comprises at least one prepolymer having multiple first propagating groups each capable of undergoing photo-induced step-growth polymerization in the presence of or in the absence of a step-growth-crosslinking agent having two or more second propagating groups each co-reactive with one of the first propagating group in a photo-induced step-growth polymerization; (2) introducing the fluid composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and (3) actinically irradiating the composition in the mold to crosslink said at least one prepolymer to form the contact lens.

In accordance with the invention, a prepolymer of the invention is obtained from a copolymer with pendant or terminal functional group by functionalizing the copolymer to include multiple propagating groups each capable of undergoing photo-induced step-growth polymerization in the presence of or in the absence of a step-growth-crosslinking agent having two or more second propagating groups each co-reactive with one of the first propagating group in a photo-induced step-growth polymerization.

As used herein, the term "functionalize" in reference to a copolymer is intended to describe that propagating groups have been covalently attached to a copolymer through the pendant or terminal functional groups of the copolymer according to a chemical process.

As used herein, the term "multiple" refers to three or more.

In accordance with the invention, any propagating groups can be used in the invention so long as the propagating groups are involved in a step-growth polymerization under actinic irradiation (preferably UV irradiation).

One preferred step-growth polymerization is thiol-ene step-growth radical polymerization, which proceeds via propagation of thiyl radical (—S*) through the vinyl group. Rather than being followed by additional propagation, this propagation step is continually followed by chain transfer of the carbon radical (—ĊH—), thus formed, to the thiol group, regenerating a thiyl radical (Scheme I).

Scheme I

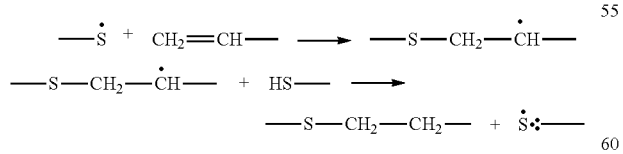

As shown in Scheme I, a pair of propagating groups, a thiol and a vinyl group, are required in photoinduced thiol-ene polymerization.

Another preferred step-growth polymerization is 2+2 cycloadditions, such as, for example, photoinduced dimerization of 2-nitrocinnamic acid (scheme II), and the photoinduced dialkyl maleiimide cycloaddition (Scheme III). As shown in schemes II and III, one propagating group is required in 2+2 cycloadditions.

Scheme II

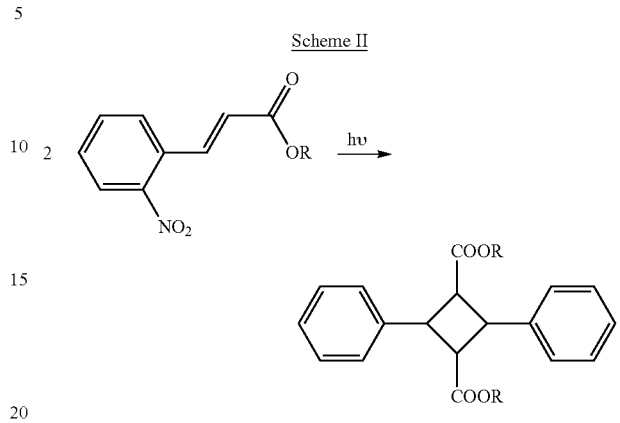

Scheme III

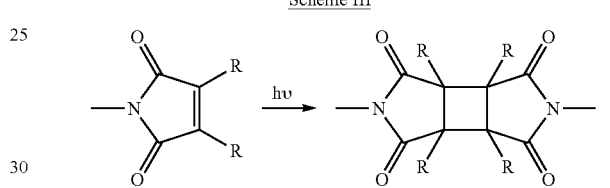

In a preferred embodiment, a prepolymer comprises multiple propagating groups selected from the group consisting of thiol groups, ene-containing groups, cinnamic acid moities, dialkylmaleimide groups, and combinations thereof.

In accordance with the invention, an ene-containing group is intended to describe that a mono-valent or divalent radical contains a carbon-carbon double which is not directly linked to a carbonyl group (—CO—), a benzene ring, nitrogen atom, or oxygen atom. Preferably, the ene-containing group is defined by any one of formula (I)-(III)

(I)

(II)

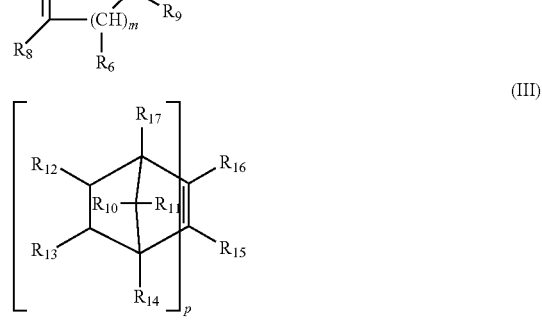

(III)

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$-$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, optionally $R_4$ and $R_9$ are linked through an alkene divalent radical to form a cyclic ring, provided that at least one of $R_4$-$R_9$ are divalent radicals; n and m independent of each other are integer number from 0 to 9, provided that the sum of n and m is an integer number from 2 to 9; $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{10}$, p is an integer number from 1 to 3, provided that only one or two of $R_{10}$-$R_{17}$ are divalent radicals.

In accordance with the invention, a cinnamic acid moiety is intended to describe that a mono-valent or divalent radical which is defined by formula (IV)

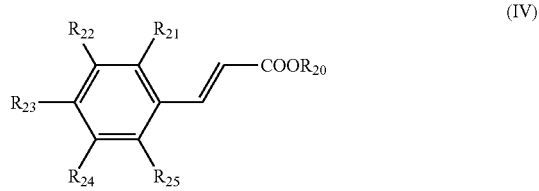

(IV)

in which $R_{20}$-$R_{25}$, independent of each other, are hydrogen, $C_1$-$C_{10}$ alkene divalent radical, $C_1$-$C_{10}$ alkyl, or —$(R_{18})_a$—$(X_1)_b$—$R_{10}$, provided that $R_{21}$ or $R_{25}$ is —$NO_2$, provided that only one or two of $R_{20}$-$R_{25}$ are divalent radicals.

In accordance with the invention, a dialkylmaleimide group is intended to describe that a mono-valent radical which is defined by formula (V)

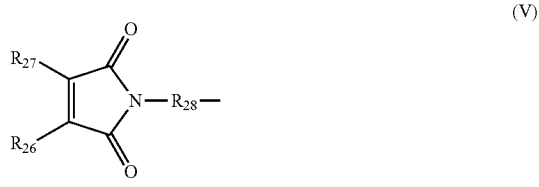

(V)

in which $R_{26}$ and $R_{27}$, independent of each other, are hydrogen or $C_1$-$C_{10}$ alkyl and $R_{28}$ is a $C_1$-$C_{10}$ alkene divalent radical.

Where the prepolymer comprises multiple ene-containing groups, these groups undergo thiol-ene step-growth radical polymerization only in the presence of thiols groups which can be provided by a step-growth-crosslinking agent having two or more thiol groups. Similarly, where the prepolymer comprises multiple thiol groups, these groups undergo thiol-ene step-growth radical polymerization only in the presence of ene-containing groups which can be provided by a step-growth-crosslinking agent having two or more ene-containing groups.

Where the prepolymer comprises multiple cinnamic acid moieties or dialkylamleimide groups, these groups can undergo photoinduced 2+2 cycloaddition polymerization in the absence of other propagating groups provided by a step-growth-crosslinking agent.

A prepolymer of the invention is capable of forming a hydrogel material (non-silicone hydrogel or silicone hydrogel), preferably in the absence of any hydrophilic vinylic monomer, and can be obtained by covalently attaching thiol groups, ene-containing groups, cinnamic acid moieties, or dialkylamleimide groups to the pendant or terminal functional groups of a copolymer according to any known covalently coupling method. It is well known in the art that a pair of matching crosslinkable groups can form a covalent bond or linkage under known reaction conditions, such as, oxidation-reduction conditions, dehydration condensation conditions, addition conditions, substitution (or displacement) conditions, Diels-Alder reaction conditions, cationic crosslinking conditions, and epoxy hardening conditions. For example, an amino group is covalently bondable with aldehyde (Schiff base which is formed from aldehyde group and amino group may further be reduced); an amino group is covalently bondable with an acid chloride, an anhydride or an isocyanate; an hydroxyl is covalently bondable with an acid chloride, an isocyanate or epoxy; or the likes.

Exemplary covalent bonds or linkage, which are formed between pairs of crosslinkable groups, include without limitation, ester, ether, acetal, ketal, vinyl ether, carbamate, urea, urethane, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary crosslinkable groups include hydroxyl group, amine group, amide group, anhydride group, sulfhydryl group, —COOR(R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy.

As an illustrative example, a prepolymer of the invention can be obtained by reacting a compound including a first crosslinkable group and a thiol group, a ene-containing group, a cinnamic acid moiety, or a dialkylamleimide group with a copolymer including multiple second crosslinkable groups, wherein the first crosslinkable group reacts with one second crosslinkable group to form a covalent bond or linkage as described above.

It is understood that coupling agents may be used. Coupling agents useful for coupling include, without limitation, N. N'-carbonyldiimidazole, carbodiimides such as 1-ethyl-3-(3-dimethylaminopropyl)carbodiimide ("EDC"), dicyclohexyl carbodiimide, 1-cylcohexyl-3-(2-morpholinoethyl) carbodiimide, diisopropyl carbodiimide, or mixtures thereof. The carbodiimides also may be used with N-hydroxysuccinimide or N-hydroxysulfosuccinimide to form esters that can react with amines to form amides.

A copolymer with pendant or terminal groups should be soluble in water, an organic solvent or a mixture of water and at least one organic solvent. Any copolymers including pendant or terminal functional groups can be used in the invention. Examples of preferred copolymers include: without limitation, copolymers of vinyl alcohol with one or more vinylic monomers in the presence or absence of a crosslinking agent; copolymers of $C_3$-$C_8$ aminoalkylacrylate with one or more vinylic monomers in the presence or absence of a crosslinking agent; copolymers of $C_3$-$C_8$ hydroxyalkylacrylate with one or more vinylic monomers in the presence or absence of a crosslinking agent; copolymers of $C_4$-$C_8$ aminoalkylmethacrylate with one or more vinylic monomers in the presence or absence of a crosslinking agent; copolymers of $C_4$-$C_8$ hydroxyalkylmethacrylate with one or more vinylic monomers in the presence or absence of a crosslinking agent; copolymers of $C_3$-$C_8$ alkylacrylic acid with one or more vinylic monomers in the presence or absence of a crosslinking agent; copolymers of $C_4$-$C_8$ alkylmethacrylic with one or more vinylic monomers in the presence or absence of a crosslinking agent; copolymers of an epoxy-containing acrylate monomer with one or more vinylic monomers in the presence or absence of a crosslinking agent; copolymers of an epoxy-containing methacrylate monomer with one or more vinylic monomers in the presence or absence of a crosslinking agent; an amine- or isocyanate-capped polyurea obtained by copolymerization of a mixture comprising (a) at least one poly(oxyalkylene)diamine, (b) optionally at least one organic di- or poly-amine, (c) optionally at least one diisocyanate, and (d) at least one polyisocyanate; a hydroxy- or isocyanate-capped polyurethane obtained by copolymerization of a mixture comprising (a) at least one poly(oxyalkylene)diol, (b) optionally at least one organic compound with di- or poly-hydroxy group, (c) optionally at least one diisocyanate, and (d) at least one polyisocyanate; siloxane-containing copolymers obtained by copolymerizing a mixture containing at least one siloxane-containing vinylic monomer, at least one siloxane-containing macromer, at least one silicone-containing prepolymer, or mixture thereof; and a copolymer of a poly(di-$C_{1-12}$ alkylsiloxane) with one or more coreactive monomers.

Alternatively, an ene-containing prepolymer of the invention can be prepared by copolymerizing a polymerizable composition including at least one monomer having one ene-group of formula (I, (II), or (III) and one ethylenically unsaturate group. The ene-group can survive (i.e., hardly participate), whereas the ethylenically unsaturated group will participate (i.e., be consumed), in a free radical polymerization in the absence of a thiol-containing compound. Examples of ene-containing acrylate or methacrylate include, without limitation.

In a preferred embodiment, a step-growth-crosslinking agent comprises two or more thiol groups or ene-containing groups which are co-reactive with the first propagating groups of the prepolymer in a photo-induced step-growth polymerization. More preferably, a step-growth-crosslinking agent is a prepolymer comprising multiple thiol groups or ene-containing groups.

Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner. Thus, after polymerization, the device will not require subsequent purification such as, for example, costly and complicated extraction of unpolymerized matrix-forming material. Furthermore, crosslinking of the prepolymer can take place absent a solvent or in aqueous solution so that a subsequent solvent exchange or the hydration step is not necessary.

In a preferred embodiment, the fluid composition comprises a prepolymer having multiple ene-containing groups defined by one of formula (I) to (III) and a step-growth-crosslinking agent having two or more thiol groups. The ene-containing groups are preferably defined by formula (II), more preferably defined by formula (III). Preferably, the step-growth-crosslinking agent is a prepolymer having multiple thiol groups. All the prepolymers in this embodiment are purified substantially before adding into the fluid composition.

In another preferred embodiment, the fluid composition comprises a prepolymer having multiple ene-containing groups defined by one of formula (I) to (III), a step-growth-crosslinking agent having two or more thiol groups, and a prepolymer having multiple acryloyl

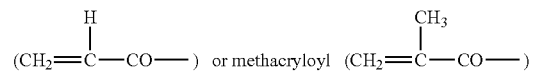

groups. The ene-containing groups are preferably defined by formula (II), more preferably defined by formula (III). Preferably, the step-growth-crosslinking agent is a prepolymer having multiple thiol groups. All the prepolymers in this embodiment are purified substantially before adding into the fluid composition.

By having both ene-containing groups and acryloyl (or methacryloyl) groups in the fluid composition, one can have two types of polymerization during the curing process: thiol-ene step-growth radical polymerization and free radical chain-growth polymerization. By adjusting these two types of polymerization, one may be able to tail a fluid composition for making contact lenses with a wide range of mechanical and physical properties.

Examples of prepolymers with multiple acryloyl or methacryloyl groups include, but are not limited to, a water-soluble crosslinkable poly(vinyl alcohol) prepolymer described in U.S. Pat. Nos. 5,583,163 and 6,303,687 (incorporated by reference in their entireties); a water-soluble vinyl group-terminated polyurethane prepolymer described in U.S. Patent Application Publication No. 2004/0082680 (herein incorporated by reference in its entirety); derivatives of a polyvinyl alcohol, polyethyleneimine or polyvinylamine, which are disclosed in U.S. Pat. No. 5,849,841 (incorporated by reference in its entirety); a water-soluble crosslinkable polyurea prepolymer described in U.S. Pat. No. 6,479,587 and in U.S. Published Application No. 2005/0113549 (herein incorporated by reference in their entireties); crosslinkable polyacrylamide; crosslinkable statistical copolymers of vinyl lactam, MMA and a comonomer, which are disclosed in EP 655,470 and U.S. Pat. No. 5,712,356 (herein incorporated by reference in their entireties); crosslinkable copolymers of vinyl lactam, vinyl acetate and vinyl alcohol, which are disclosed in EP 712,867 and U.S. Pat. No. 5,665,840 (herein incorporated by reference in their entireties); polyether-polyester copolymers with crosslinkable side chains which are disclosed in EP 932,635 and U.S. Pat. No. 6,492,478 (herein incorporated by reference in their entireties); branched polyalkylene glycol-urethane prepolymers disclosed in EP 958,315 and U.S. Pat. No. 6,165,408 (herein incorporated by reference in their entireties); polyalkylene glycol-tetra(meth)acrylate prepolymers disclosed in EP 961,941 and U.S. Pat. No. 6,221,303 (herein incorporated by reference in their entireties); crosslinkable polyallylamine gluconolactone prepolymers disclosed in International Application No. WO 2000/31150 and U.S. Pat. No. 6,472,489 (herein incorporated by reference in their entireties); silicone-containing prepolymers are those described in U.S. Published Application No. 2001-0037001 A1, U.S. Pat. No. 6,039,913, U.S. patent application No. 60/830,288 (herein incorporated by reference in their entireties).

In another preferred embodiment, the fluid composition comprises a silicone-containing prepolymer having multiple ene-containing groups defined by one of formula (I) to (III) and a step-growth-crosslinking agent having two or more thiol groups. The ene-containing groups are preferably defined by formula (II), more preferably defined by formula (III). Preferably, the step-growth-crosslinking agent is a prepolymer having multiple thiol groups. The thiol-containing prepolymer can be silicone free prepolymer or silicone-containing prepolymer. All the prepolymers in this embodiment preferably are purified substantially before being added into the fluid composition.

In another preferred embodiment, the fluid composition comprises a silicone-containing prepolymer having multiple ene-containing groups defined by one of formula (I) to (III), a step-growth-crosslinking agent having two or more thiol groups, and a prepolymer having multiple acryloyl

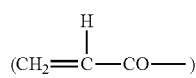

or methacryloyl

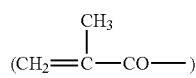

groups. The ene-containing groups are preferably defined by formula (II), more preferably defined by formula (III). Preferably, the step-growth-crosslinking agent is a prepolymer having multiple thiol groups. The thiol-containing prepolymer can be silicone free prepolymer or silicone-containing prepolymer. All the prepolymers in this embodiment preferably are purified substantially before being added into the fluid composition.

The fluid composition can optionally comprises one or more vinylic monomer and/or one or more crosslinking agents (i.e., compounds with two or more ethylenically unsaturated groups and with molecular weight less than 700 Daltons). However, the amount of those components should be low such that the final ophthalmic device does not contain unacceptable levels of unpolymerized monomers and/or crosslinking agents. The presence of unacceptable levels of unpolymerized monomers and/or crosslinking agents will require extraction to remove them, which requires additional steps that are costly and inefficient. But preferably, the fluid composition is substantially free of vinylic monomer and crosslinking agent (i.e., preferably about 2% or less, more preferably about 1% or less, even more preferably about 0.5% or less by weight).

The composition can be a solution, a solvent-free liquid, or a melt. Preferably, a fluid composition is a solution of at least one prepolymer in water, or an organic solvent, or a mixture of water and one or more organic solvents.

A solution of at least one prepolymer can be prepared by dissolving the prepolymer and other components in any suitable solvent known to a person skilled in the art. Examples of suitable solvents are, without limitation, water, alcohols (e.g., methanol, ethanol, propanol, or alkanols having 4 to 15 carbons), carboxylic acid amides (e.g., dimethylformamide), dipolar aprotic solvents (e.g., dimethyl sulfoxide or methyl ethyl ketone), ketones (e.g., acetone or cyclohexanone), hydrocarbons (e.g., toluene), ethers, tetrahydrofuran (THF), dimethoxyethane, dioxane, diethylenglycolmonoethylether, diethylenglycolmonomethylether, diethylenglycoldimethylether, diethylenglycoldiethylether, halogenated hydrocarbons (e.g., trichloroethane), and mixtures thereof.

It must be understood that a fluid composition can also comprise various components, such as, for example, polymerization initiators (e.g., photoinitiator or thermal initiator), a visibility tinting agent (e.g., dyes, pigments, or mixtures thereof), UV-blocking agent, photosensitizers, inhibitors, antimicrobial agents (e.g., preferably silver nanoparticles or stabilized silver nanoparticles), bioactive agent, lubricants, fillers, and the like, as known to a person skilled in the art.

Initiators, for example, selected from materials well known for such use in the polymerization art, may be included in the polymerizable fluid composition in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronite (AIBN).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of lubricants include without limitation mucin-like materials and hydrophilic polymers. Exemplary mucin-like materials include without limitation polyglycolic acid, polylactides, collagen, hyaluronic acid, and gelatin.

Exemplary hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof.

Examples of N-vinyl lactams include N-vinyl-2-pyrrolidone, N-vinyl-2-piperidone, N-vinyl-2-caprolactam, N-vinyl-3-methyl-2-pyrrolidone, N-vinyl-3-methyl-2-piperidone, N-vinyl-3-methyl-2-caprolactam, N-vinyl-4-methyl-2-pyrrolidone, N-vinyl-4-methyl-2-caprolactam, N-vinyl-5-methyl-2-pyrrolidone, N-vinyl-5-methyl-2-piperidone, N-vinyl-5,5-dimethyl-2-pyrrolidone, N-vinyl-3,3,5-trimethyl-2-pyrrolidone, N-vinyl-5-methyl-5-ethyl-2-pyrrolidone, N-vinyl-3,4,5-trimethyl-3-ethyl-2-pyrrolidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, and N-vinyl-3,5,7-trimethyl-2-caprolactam.

The number-average molecular weight $M_n$ of the hydrophilic polymer is, for example, greater than 10,000, or greater than 20,000, than that of the matrix forming material. For example, when the matrix forming material is a water-soluble prepolymer having an average molecular weight $M_n$ of from 12,000 to 25,000, the average molecular weight $M_n$ of the hydrophilic polymer is, for example, from 25,000 to 100000, from 30,000 to 75,000, or from 35,000 to 70,000.

A suitable polyoxyethylene derivative is, for example, n-alkylphenyl polyoxyethylene ether, n-alkyl polyoxy-ethylene ether (e.g., TRITON®), polyglycol ether surfactant (TERGITOL®), polyoxyethylenesorbitan (e.g., TWEEN®), polyoxyethylated glycol monoether (e.g., BRIJ®, polyoxylethylene 9 lauryl ether, polyoxylethylene 10 ether, polyoxylethylene 10 tridecyl ether), or a block copolymer of ethylene oxide and propylene oxide.

Examples of block copolymers of ethylene oxide and propylene oxide include without limitation poloxamers and poloxamines, which are available, for example, under the tradename PLURONIC®, PLURONIC-R®, TETRONIC®, TETRONIC-R® or PLURADOT®. Poloxamers are triblock copolymers with the structure PEO-PPO-PEO (where "PEO" is poly(ethylene oxide) and "PPO" is poly(propylene oxide).

A considerable number of poloxamers is known, differing merely in the molecular weight and in the PEO/PPO ratio; Examples of poloxamers include 101, 105, 108, 122, 123, 124, 181, 182, 183, 184, 185, 188, 212, 215, 217, 231, 234, 235, 237, 238, 282, 284, 288, 331, 333, 334, 335, 338, 401, 402, 403 and 407. The order of polyoxyethylene and polyoxypropylene blocks can be reversed creating block copolymers with the structure PPO-PEO-PPO, which are known as PLURONIC-R® polymers.

Poloxamines are polymers with the structure (PEO-PPO)$_2$—N—(CH$_2$)$_2$—N—(PPO-PEO)$_2$ that are available with different molecular weights and PEO/PPO ratios. Again, the order of polyoxyethylene and polyoxypropylene blocks can be reversed creating block copolymers with the structure (PPO-PEO)$_2$—N—(CH$_2$)$_2$—N-(PEO-PPO)$_2$, which are known as TETRONIC-R® polymers.

Polyoxypropylene-polyoxyethylene block copolymers can also be designed with hydrophilic blocks comprising a random mix of ethylene oxide and propylene oxide repeating units. To maintain the hydrophilic character of the block, ethylene oxide will predominate. Similarly, the hydrophobic block can be a mixture of ethylene oxide and propylene oxide repeating units. Such block copolymers are available under the tradename PLURADOT®.

In accordance with the invention, the fluid composition can be introduced (dispensed) into a cavity formed by a mold according to any known methods.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711 to Schad; 4,460,534 to Boehm et al.; 5,843,346 to Morrill; and 5,894,002 to Boneberger et al., which are also incorporated herein by reference.

Virtually all materials known in the art for making molds can be used to make molds for preparing ocular lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz glass and sapphire.

In a preferred embodiment, when the polymerizable components in the fluid composition is composed essentially of prepolymers, reusable molds can be used. Examples of reusable molds made of quartz or glass are those disclosed in U.S. Pat. No. 6,627,124, which is incorporated by reference in their entireties. In this aspect, the fluid composition is poured into a mold consisting of two mold halves, the two mold halves not touching each other but having a thin gap of annular design arranged between them. The gap is connected to the mold cavity, so that excess prepolymer composition can flow into the gap. Instead of polypropylene molds that can be used only once, it is possible for reusable quartz, glass, sapphire molds to be used, since, following the production of a lens, these molds can be cleaned rapidly and effectively to remove unreacted materials and other residues, using water or a suitable solvent, and can be dried with air. Reusable molds can also be made of a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced and high fidelity to the lens design.

After the fluid is dispensed into the mold, it is polymerized to produce a contact lens. Crosslinking and/or polymerizing may be initiated in the mold e.g. by means of actinic radiation, such as UV irradiation, ionizing radiation (e.g., gamma or X-ray irradiation). Where prepolymers of the invention are the polymerizable components in the fluid composition, the mold containing the fluid composition can be exposed to a spatial limitation of actinic radiation to crosslink the prepolymers.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

What is notable is that the crosslinking according to the invention may be effected in a very short time, e.g. in $\leq 60$ minutes, advantageously in $\leq 20$ minutes, preferably in $\leq 10$ minutes, most preferably in $\leq 5$ minutes, particularly preferably in 1 to 60 seconds and most particularly in 1 to 30 seconds.

What is also notable is that the contact lenses according to the invention can be produced from one or more radiation-curable prepolymers of the invention in a very simple and efficient way compared with the prior art. This is based on many factors. On the one hand, the starting materials may be acquired or produced inexpensively. Secondly, there is the advantage that the prepolymers are surprisingly stable, so that they may undergo a high degree of purification. There is no practical need for subsequent purification, such as in particular complicated extraction of unpolymerized constituents after curing lenses. Furthermore, the new polymerization method can be used to produce contact lenses with desirable mechanical and physical properties. Finally, photo-polymerization is effected within a short period, so that from this point of view also the production process for the contact lenses according to the invention may be set up in an extremely economic way.

Opening of the mold so that the molded article can be removed from the mold may take place in a manner known per se.

If the molded contact lens is produced solvent-free from an already purified prepolymer according to the invention, then after removal of the molded lens, it is not normally necessary to follow up with purification steps such as extraction. This is because the prepolymers employed do not contain any undesired constituents of low molecular weight; consequently, the crosslinked product is also free or substantially free from such constituents and subsequent extraction can be dispensed with. Accordingly, the contact lens can be directly transformed in the usual way, by hydration, into a ready-to-use contact lens. Appropriate embodiments of hydration are known to the person skilled in the art, whereby ready-to-use contact lenses with very varied water content may be obtained. The contact lens is expanded, for example, in water, in an aqueous salt solution, especially an aqueous salt solution having an osmolarity of about 200 to 450 milli-osmole in 1000 ml (unit: mOsm/ml), preferably about 250 to 350 mOsm/l and especially about 300 mOsm/l, or in a mixture of water or an aqueous salt solution with a physiologically compatible polar organic solvent, e.g. glycerol. Preference is given to expansions of the article in water or in aqueous salt solutions.

If the molded contact lens is produced from an aqueous solution of an already purified prepolymer according to the invention, then the crosslinked product also does not contain any troublesome impurities. It is therefore not necessary to carry out subsequent extraction. Since crosslinking is carried out in an essentially aqueous solution, it is additionally unnecessary to carry out subsequent hydration. The contact lenses obtained by this process are therefore notable, according to an advantageous embodiment, for the fact that they are suitable for their intended usage without extraction. By intended usage is understood, in this context, that the contact lenses can be used in the human eye.

Similarly, if the molded contact lens is produced from a solvent solution of an already purified prepolymer according to the invention, it is not necessary to carry out subsequent extraction, but instead of hydration process to replace the solvent.

The molded contact lenses can further subject to further processes, such as, for example, surface treatment, sterilization, and the like.

In another aspect, the invention provides a prepolymer suitable for making soft hydrogel contact lenses. The prepolymer of the invention comprises multiple first propagating groups each capable of undergoing photo-induced step-growth polymerization in the presence of or in the absence of second propagating groups each co-reactive with the first propagating group in a photo-induced step-growth polymerization, wherein the prepolymer is capable of being crosslinked under actinic irradiation to form a hydrogel material in the absence of any vinylic monomer and/or any compound having from two to eight acryloyl or methacryloyl groups and having a molecular weight of less than 700 Daltons.

In a preferred embodiment, a prepolymer suitable for making soft hydrogel contact lenses comprises: multiple thiol groups, multiple ene-containing groups of formula (I), (II) or (III), multiple cinnamic acid moieties of formula (IV), multiple dialkylalmeimide groups of formula (V), or combinations thereof, wherein the prepolymer is capable of being crosslinked under actinic irradiation to form a hydrogel material in the absence of any vinylic monomer and/or any compound having from two to eight acryloyl or methacryloyl groups and having a molecular weight of less than 700 Daltons.

As described above, a prepolymer of the invention is obtained from a copolymer with pendant or terminal functional groups by covalently attaching thiol groups, ene-containing groups of formula (I), (II) or (III), cinnamic acid moieties of formula (IV), dialkylalmeimide groups of formula (V) to the copolymer through the pendant or terminal functional groups. Preferably, the functional group is selected from the group consisting of hydroxyl groups (—OH), primary amino groups (—NH$_2$), secondary amino groups (—NHR), carboxylic groups (—COOH), epoxy groups, aldehyde groups (—CHO), amide groups (—CONH$_2$), acid halide groups (—COX, X=Cl, Br, or I), isothiocyanate groups, isocyanate groups, halide groups (—X, X=Cl, Br, or I), acid anhydride groups, and combinations thereof. Preferably, the copolymer with pendant or terminal functional groups comprises at least one siloxane units.

In a preferred embodiment, the copolymer with pendant or terminal functional groups is obtained by copolymerization of a composition comprising (1) at least one hydrophilic vinylic monomer (i.e., having one ethylenically unsaturated double bond), (2) at least one silicone-containing monomer having one ethylenically unsaturated double bond, at least one siloxane-containing macromer having one ethylenically unsaturated double bond, at least one siloxane-containing macromer having two or more ethylenically unsaturated double bonds, a polysiloxane having two or more ethylenically unsaturated double bonds, a perfluoroalkyl polyether having two or more ethylenically unsaturated double bonds, a polysiloxane/perfluoroalkyl polyether block copolymer having two or more ethylenically unsaturated double bonds, or a combination of two or more thereof, (3) optionally at least one hydrophobic vinylic monomer (i.e., having one ethylenically unsaturated double bond); and (4) optionally one or more hydrophilic prepolymers having multiple acryloyl or methacryloyl groups, provided that at least one of components (1)-(4) further comprises at least one functional group through which a thiol group, an ene-containing group, a cinnamic acid moiety, or an dialkylalmeimide group can be covalently linked to the obtained copolymer.

In another preferred embodiment, the copolymer with pendant or terminal functional groups is obtained by copolymerization of a composition comprising (1) at least one hydrophilic vinylic monomer, (2) at least one silicone-containing monomer having one ethylenically unsaturated double bond, at least one siloxane-containing macromer having one ethylenically unsaturated double bond, at least one siloxane-containing macromer having two or more ethylenically unsaturated double bonds, a polysiloxane having two or more ethylenically unsaturated double bonds, a perfluoroalkyl polyether two or more ethylenically unsaturated double bonds, a polysiloxane/perfluoroalkyl polyether block copolymer two or more ethylenically unsaturated double bonds, or a combination of two or more thereof, (3) optionally at least one hydrophobic vinylic monomer; (4) optionally one or more hydrophilic prepolymers having multiple acryloyl or methacryloyl groups, and (5) at least one chain transfer agent having a functional group.

In another preferred embodiment, the copolymer is a fluorine-containing copolymer with pendant or terminal functional groups which is a copolymerization product of a polymerizable composition. The composition comprises (a) at least one fluorine-containing vinylic monomer, (b) at least one hydrophilic vinylic monomer, (c) at least one functionalizing vinylic monomer containing at least one functional group, and (d) at least one silicone-containing monomer having one ethylenically unsaturated double bond, at least one siloxane-containing macromer having one ethylenically unsaturated double bond, at least one siloxane-containing macromer having two or more ethylenically unsaturated double bonds, a polysiloxane having two or more ethylenically unsaturated double bonds, a perfluoroalkyl polyether two or more ethylenically unsaturated double bonds, a polysiloxane/perfluoroalkyl polyether block copolymer two or more ethylenically unsaturated double bonds, or a combination of two or more thereof. The polymerizable composition can also include a polymerization initiator (i.e., a photoinitiator or a thermal initiator), a solvent, and a chain transfer agent.

In another preferred embodiment, the fluorine-containing copolymer with pendant or terminal functional groups is a copolymerization product of a polymerizable composition, which comprises (a) at least one fluorine-containing vinylic monomer, (b) at least one hydrophilic vinylic monomer, (c) at least one silicone-containing monomer having one ethylenically unsaturated double bond, at least one siloxane-containing macromer having one ethylenically unsaturated double bond, at least one siloxane-containing macromer having two or more ethylenically unsaturated double bonds, a polysiloxane having two or more ethylenically unsaturated double bonds, a perfluoroalkyl polyether two or more ethylenically unsaturated double bonds, a polysiloxane/perfluoroalkyl polyether block copolymer two or more ethylenically unsaturated double bonds, or a combination of two or more thereof, and (d) at least one chain transfer agent having a functional group. The polymerizable composition can also include a polymerization initiator (i.e., a photoinitiator or a thermal initiator), a solvent, and a chain transfer agent.

Nearly any hydrophilic vinylic monomer can be used in the fluid composition of the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl) acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1-dimethyl-3-oxobutyl)acrylamide, acrylic acid, and methacrylic acid.

Suitable hydrophobic vinylic monomers include, without limitation, $C_1$-$C_{18}$-alkylacrylates and -methacrylates, $C_3$-$C_{18}$ alkylacrylamides and -methacrylamides, acrylonitrile, methacrylonitrile, vinyl-$C_1$-$C_{18}$-alkanoates, $C_2$-$C_{18}$-alkenes, $C_2$-$C_{18}$-halo-alkenes, styrene, $C_1$-$C_6$-alkylstyrene, vinylalkylethers in which the alkyl moiety has 1 to 6 carbon atoms, $C_2$-$C_{10}$-perfluoralkyl-acrylates and -methacrylates or correspondingly partially fluorinated acrylates and methacrylates, $C_3$-$C_{12}$-perfluoralkyl-ethyl-thiocarbonylaminoethyl-acrylates and -methacrylates, acryloxy and methacryloxy-alkylsiloxanes, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, tris-trimethylsilyloxy-silyl-propyl methacrylate, 3-methacryloxypropyl-pentamethyl-disiloxane and bis(methacryloxypropyl)-tetramethyl-disiloxane.

Any know suitable vinylic monomer containing at least one functional group can be used in the present invention. Preferred examples of such vinylic monomers includes methacrylic acid (MAA), acrylic acid, glycidylmethacrylate, glycidylacrylate, HEMA, HEA, methacrylic anhydride, N-hydroxymethylacrylamide (NHMA), 2-bromoethylmethacrylate, and vinylbenzylchloride.

Any silicone-containing vinylic monomers can be used in the invention. Examples of silicone-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, monoacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, and tristrimethylsilyloxysilylpropyl methacrylate (TRIS), N-[tris(trimethylsiloxy)silylpropyl]methacrylamide ("TSMAA"), N-[tris(trimethylsiloxy)silylpropyl]acrylamide ("TSAA"), 2-propenoic acid, 2-methyl-,2-hydroxy-3-[3-[1,3,3,3-tetramethyl-1-[(trimethylsilyl)oxy]disiloxanyl]propoxy]propyl ester (which can also be named (3-methacryloxy-2-hydroxypropyloxy)propylbis(trimethylsiloxy)methylsilane), (3-methacryloxy-2-hydroxypropyloxy)propyltris(trimethylsiloxy)silane, bis-3-methacryloxy-2-hydroxypropyloxypropyl polydimethylsiloxane, 3-methacryloxy-2-(2-hydroxyethoxy)propyloxy)propylbis(trimethylsiloxy)methylsilane, N,N,N',N'-tetrakis(3-methacryloxy-2-hydroxypropyl)-alpha,omega-bis-3-aminopropyl-polydimethylsiloxane, polysiloxanylalkyl(meth)acrylic monomers, silicone-containing vinyl carbonate or vinyl carbamate monomers (e.g., 1,3-bis[4-vinyloxycarbonyloxy]but-1-yl]tetramethyl-disiloxane; 3-(trimethylsilyl), propyl vinyl carbonate, 3-(vinyloxycarbonylthio)propyl-[tris(trimethylsiloxy)silane], 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethylsiloxyethyl vinyl carbonate; trimethylsilylethyl vinyl carbonate, and trimethylsilylmethyl vinyl carbonate). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane. Monomethacrylated or monoacrylated polydimethylsiloxanes of various molecular weight could be used. Dimethacrylated or Diacrylated polydimethylsiloxanes of various molecular weight could also be used.

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers could be mono or difunctionalized with acrylate, methacrylate or vinyl groups. Macromers that contain two or more polymerizable groups (vinylic groups) can also serve as cross linkers. Di and triblock macromers consisting of polydimethylsiloxane and polyakyleneoxides could also be of utility. For example one might use methacrylate end capped polyethyleneoxide-block-polydimethylsiloxane-block-polyethyleneoxide to enhance oxygen permeability.

Examples of silicone-containing prepolymers include without limitation those disclosed in US Patent Application Publication No. US 2001-0037001 A1 and U.S. Pat. No. 6,039,913, which are incorporated herein by references in their entireties.

Preferred example of polysiloxanes having two or more ethylenically unsaturated double bonds, perfluoroalkyl polyethers having two or more ethylenically unsaturated double bonds, polysiloxane/perfluoroalkyl polyether block copolymers having two or more ethylenically unsaturated double bonds are disclosed in U.S. Pat. No. 7,091,283 (herein incorporated by reference in its entirety.

A preferred polysiloxane having two or more ethylenically unsaturated double bonds is defined by formula (1)

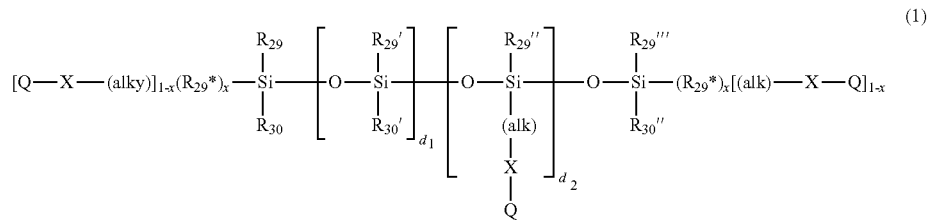

(1)

in which (alk) is alkylene having up to 20 carbon atoms which may be interrupted by —O—; X is —O— or —NR$_{31}$—, R$_{31}$ is hydrogen or C$_1$-C$_6$-alkyl, Q is an organic radical comprising a crosslinkable or polymerizable group, 80-100% of the radicals R$_{29}$, R$_{29}'$, R$_{29}''$, R$_{29}'''$, R$_{29}*$, R$_{30}$, R$_{30}'$ and R$_{30}''$, independently of one another, are C$_1$-C$_8$-alkyl and 0-20% of the radicals R$_{29}$, R$_{29}'$, R$_{29}''$, R$_{29}'''$, R$_{29}*$, R$_{30}$, R$_{30}'$ and R$_{30}''$, independently of one another, are unsubstituted or C$_1$-C$_4$ alkyl- or C$_1$-C$_4$-alkoxy-substituted phenyl, fluoro(C$_1$-C$_{18}$-alkyl), cyano(C$_1$-C$_{12}$-alkyl), hydroxy-C$_1$-C$_6$-alkyl or amino-C$_1$-C$_6$-alkyl, x is the number 0 or 1, d$_1$ is an integer of from 5 to 700, d$_2$ is an integer from 0 to 8 if x is 0, and is 2 to 10 if x is 1, and the sum of (d$_1$+d$_2$) is from 5 to 700.

A more preferred polysiloxane having two or more ethylenically unsaturated double bonds is defined by formula (2)

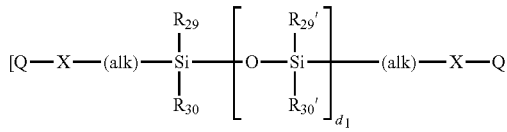
(2)

wherein R$_{29}$, R$_{29}'$, R$_{30}$ and R$_{30}'$ are each methyl, d$_1$ is an integer from 10 to 300, (alk) is linear or branched C$_2$-C$_6$ alkylene or a radical —(CH$_2$)$_{1-3}$—O—(CH$_2$)$_{1-3}$—, X is —O— or —NH— and Q is a radical of the formula (3), (4), (5), or (6)

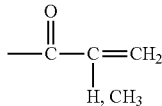
(3)

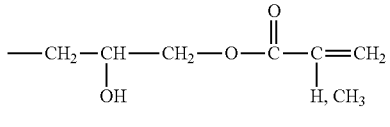
(4)

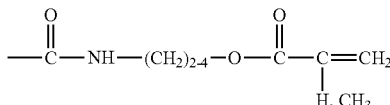
(5)

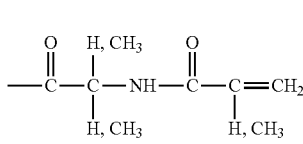
(6)

Another more preferred polysiloxane having two or more ethylenically unsaturated double bonds is defined by formula (7)

Q-(PDMS)$_1$-L-(PDMS)$_2$-Q                    (7), in which (PDMS)$_1$ and (PDMS)$_2$ are, each, independently of the other, a radical of formula (8)

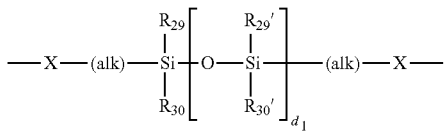
(8)

in which R$_{29}$, R$_{29}'$, R$_{30}$ and R$_{30}'$ are each methyl, d$_1$ is an integer from 10 to 300, (alk) is linear or branched C$_2$-C$_6$ alkylene or a radical —(CH$_2$)$_{1-3}$—O—(CH$_2$)$_{1-3}$—, X is —O— or —NH—, wherein the weight average molecular weight of the segment of formula (8) is in the range of from 180 to 6000; Q is an organic radical comprising a crosslinkable or polymerizable group; and L is a difunctional linking group.

A preferred perfluoroalkyl polyether having two or more ethylenically unsaturated double bonds formula (9)

Q-(PFPE-L)$_{n-1}$-PFPE-Q                   (9)

wherein n is ≥1, each PFPE may be the same or different and is a perfluorinated polyether of formula (10)

—OCH$_2$CF$_2$O(CF$_2$CF$_2$O)$_z$(CF$_2$O)$_y$CF$_2$CH$_2$O—   (10)

wherein the CF$_2$CF$_2$O and CF$_2$O units may be randomly distributed or distributed as blocks throughout the chain and wherein z and y may be the same or different such that the weight average molecular weight of the perfluoropolyether is in the range of from 500 to 4,000; wherein L is a difunctional linking group; and wherein Q is an organic radical comprising a crosslinkable or polymerizable group.

A more preferred perfluoroalkyl polyether having two or more ethylenically unsaturated double bonds is defined by formula (11)

Q-PFPE-Q                                    (11)

wherein Q is an organic radical comprising a crosslinkable or polymerizable group; PFPE is a perfluorinated polyether of formula (10) in which z and y may be the same or different such that the molecular weight of the perfluoroalkyl polyether is in the range of from 500 to 2,500.

A polysiloxane/perfluoroalkyl polyether block copolymer having two or more ethylenically unsaturated double bonds is defined by formula (12)

Q-PFPE-L-M-L-PFPE-Q                         (12)

wherein L is a difunctional linking group; Q is an organic radical comprising a crosslinkable or polymerizable group; PFPE is a perfluorinated polyether of formula (10) in which z and y may be the same or different such that the molecular weight of the perfluoroalkyl polyether is in the range of from 500 to 2,500; and M is a radical of formula (8) in which R$_{29}$, R$_{29}'$, R$_{30}$ and R$_{30}'$ are each methyl, d$_1$ is an integer from 10 to 300, (alk) is linear or branched C$_2$-C$_6$ alkylene or a radical —(CH$_2$)$_{1-3}$—O—(CH$_2$)$_{1-3}$—, X is —O— or —NH—, wherein the weight average molecular weight of the segment of formula (8) is in the range of from 180 to 6000.

Examples of hydrophilic prepolymers with multiple acryloyl or methacryloyl groups include, but are not limited to, a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Patent Application Publication No. 2004/0082680; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. No. 6,479,587 and in U.S. Published Application No. 2005/0113549; crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; polyalkylene glycol-tetra(meth)acrylate prepolymers disclosed in EP 961,941 and U.S. Pat. No. 6,221,303; and crosslinkable polyallylamine gluconolactone prepolymers disclosed in International Application No. WO 2000/31150 and U.S. Pat. No. 6,472,489.

The functional chain transfer agent is used to control the molecular weight of the resulting copolymer and to provide functionality for subsequent addition of a thiol group, an ene-containing group, a cinnamic acid moiety, a dialkylmaleimide group. The chain transfer agent may comprise one or more thiol groups, for example two or most preferably one thiol group. Suitable chain transfer agents include organic primary thiols or mercaptans having a further functional group such as, for example, hydroxy, amino, N—$C_1$-$C_6$-alkylamino, carboxy or a suitable derivative thereof. A preferred chain transfer agent is a cycloaliphatic or preferably aliphatic thiol having from 2 to about 24 carbon atoms and having a further functional group selected from amino, hydroxy and carboxy; accordingly, the preferred chain transfer agents are aliphatic mercapto carboxylic acids, hydroxymercaptans or aminomercaptans. Examples of particularly preferred chain transfer agents are thioglycolic acid, 2-mercaptoethanol and especially 2-aminoethane thiol (cysteamine). In case of an amine or a carboxylic acid, the chain transfer agent may be in form of the free amine or acid or, preferably, in form of a suitable salt thereof, for example a hydrochloride in case of an amine or a sodium, potassium or amine salt in case of an acid. An example for a chain transfer agent having more than one thiol group is the reaction product of one equivalent of diethylene triamine with about two equivalents of -thiobutyrolactone.

Any fluorine-containing (or fluorinated) monomer can be used in the invention. Preferably, a fluorine-containing monomer contains at least 3 fluorine atoms per monomer molecule that itself contains from about 4 to about 20, preferably from about 6 to about 15 carbon atoms, sometimes also referred as a polyfluorinated monomer.

Preferred fluorinated monomers include 2-(N-ethyl-perfluorooctanesulfonamido)-ethylacrylate (FX-13), 2-(N-ethyl-perfluoro-octanesulfonamido)ethyl methacrylate (FX-14), 2,2,2-trifluoroethyl methacrylate (TEM), 1,1-dihydroperfluoroethylacrylate, 1H,1H,7H-dodecafluoroheptyl acrylate (DFHA), hexafluoroisopropyl acrylate, 1H,1H,2H,2H-heptadecafluorodecyl acrylate, pentafluorostyrene (PFS), trifluoromethylstyrene, pentafluoroethyl acrylate, pentafluoroethyl methacrylate, hexafluoroisopropyl acrylate, hexafluoroisopropyl methacrylate (HFIPMA), methacrylate-functionalized fluorinated polyethylene oxides, and the like. A preferred fluorinated monomer containing 3 to about 20 fluorine atoms per monomer molecule is an amide or ester of acrylic acid or methacrylic acid. Particularly preferred fluorinated monomers containing 3 to about 20 fluorine atoms per monomer molecule are FX-13, FX-14 and 1H,1H,2H,2H-heptadecafluorodecyl acrylate that contain 13 or 14 carbon atoms and PFS and HFIPMA that contain six to eight carbon atoms. The most preferred of these monomers are FX-13 and FX-14 that are sulfonamido ethyl esters of acrylic acid or methacrylic acid.

Any know suitable vinylic monomer containing at least one functional group can be used as functionalizing vinylic monomer in the present invention. Preferred examples of such vinylic monomers includes methacrylic acid (MAA), acrylic acid, glycidylmethacrylate, glycidylacrylate, HEMA, HEA, methacrylic anhydride, N-hydroxymethylacrylamide (NHMA), 2-bromoethylmethacrylate, and vinylbenzylchloride.

It should be understood that a vinylic monomer can be used both as a hydrophilic vinylic monomer and as a functionalizing vinylic monomer in the polymerizable composition for preparing the silicone-containing polymer with pendant or terminal functional groups. Preferably, the hydrophilic vinylic monomer is devoid of functional groups (e.g., DMA, NVP).

In a further aspect, the invention provides a soft hydrogel contact lens. The contact lens of the invention is obtained by polymerization of a fluid composition, wherein the composition comprises at least one prepolymer having multiple first propagating groups each capable of undergoing photo-induced step-growth polymerization in the presence of or in the absence of a step-growth-crosslinking agent having two or more second propagating groups each co-reactive with one of the first propagating group in a photo-induced step-growth polymerization, provided that the composition is substantially free of any vinylic monomer.

In still a further aspect, the invention provides a fluid composition for making medical devices, preferably ophthalmic device, more preferably soft hydrogel contact lenses. The fluid composition of the invention comprises at least one prepolymer having multiple first propagating groups each capable of undergoing photo-induced step-growth polymerization in the presence of or in the absence of a step-growth-crosslinking agent having two or more second propagating groups each co-reactive with one of the first propagating group in a photo-induced step-growth polymerization, wherein the composition is characterized by having a low viscosity and being capable of undergoing photo-induced step-growth polymerization to crosslink the prepolymer to form a hydrogel material, provided that the composition is substantially free of any vinylic monomer.

Various embodiments of a fluid composition and prepolymers are described above.

Throughout this application, various publications are referenced. The disclosures of these publications in their entireties are hereby incorporated by reference into this application in order to more fully describe the compounds, compositions and methods described herein.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Synthesis of Norbornene Carbonyl Chloride

A 500 mL sulfur flask was equipped with magnetic stirring, addition funnel, thermometer, reflux condenser with N2-inlet adapter, and outlet adapter connected to a trap immersed in a dry ice/acetone bath. 58.28 g of 2-norbornene-5-carboxylic acid (Aldrich) were charged to the reactor under a positive flow of nitrogen, then 31.4 mL of thionyl chloride (51.32 g). 450 mL of methyl-tert-butyl ether were added, an ice bath was applied, and the contents of the reactor were stirred to mix and cool to 3° C. 51.6 mL of triethylamine (37.45 g) and 20 mL of MTBE were charged to the addition funnel and added dropwise to keep temperature less than 10° C. On completion of the addition the ice bath was removed and the flask was stirred for one hour. The resulting suspension was filtered to remove triethylamine hydrochloride. The resulting clear yellow solution was reduced to an oil on a rotary evaporator and purified by fractional distillation at 8 mBar (fraction boiling at 62-75°

C.). 72% recovery at 99.13% purity was attained. The product was stored in a desiccator at room temperature until use.

Example 2

Synthesis of alpha-omega-diacrylamide Poly(dimethylsiloxane) 4500

In a 4-L beaker, 61.73 g of $Na_2CO_3$ (996 mEq), 80 g of NaCl and 1.52 kg of deionized water were mixed to dissolve. In a separate 4-L beaker, 700 g of alpha, omega-aminopropyl-polydimethylsiloaxane (Shin-Etsu manufacture, MW ca. 4500, 305 mEq) were dissolved in 1000 g of hexane. A 4-L reactor was equipped with overhead stirring with turbine agitator and a 250-mL addition funnel with micro-flow controller. The two solutions were then charged to the reactor, and mixed for 15 minutes with heavy agitation to produce an emulsion. 36.6 g of acryloyl chloride (405 mEq) was dissolved in 100 mL of hexane and charged to the addition funnel. The acryloyl chloride solution was added dropwise to the emulsion under heavy agitation over one hour. The emulsion was stirred for 30 minutes on completion of the addition and then agitation was stopped and the phases were allowed to separate overnight. The aqueous phase was decanted and the organic phase was washed twice with a mixture of 2.0 kg of 2.5% NaCl dissolved in water. The organic phase was then dried over magnesium sulfate, filtered to 1.0 μm exclusion, and concentrated on a rotary evaporator. The resulting oil was further purified by high-vacuum drying to constant weight. Analysis of the resulting product by titration revealed 0.435 mEq/g of C=C double bonds.

Example 3

Synthesis of alpha-omega-diacrylamide Poly(dimethylsiloxane) 2500

In a 4-L beaker, 111.1 g of $Na_2CO_3$ hydrate (1790 mEq), 80 g of NaCl and 1.52 kg of deionized water were mixed to dissolve. In a separate 4-L beaker, 700 g of alpha, omega-aminopropyl-polydimethylsiloaxane (Shin-Etsu manufacture, MW ca. 2500, 560 mEq) were dissolved in 1000 g of hexane. A 4-L reactor was equipped with overhead stirring with turbine agitator and a 250-mL addition funnel with micro-flow controller. The two solutions were then charged to the reactor, and mixed for 15 minutes with heavy agitation to produce an emulsion. 65.89 g of acryloyl chloride (728.1 mEq) was dissolved in 100 mL of hexane and charged to the addition funnel. The acryloyl chloride solution was added dropwise to the emulsion under heavy agitation over one hour. The emulsion was stirred for 30 minutes on completion of the addition and then agitation was stopped and the phases were allowed to separate overnight. The aqueous phase was decanted and the organic phase was washed twice with 2.0 kg portions of 2.5% NaCl dissolved in water. The organic phase was then dried over magnesium sulfate, filtered to 1.0 μm exclusion, and concentrated on a rotary evaporator. The resulting oil was further purified by high-vacuum drying to constant weight. Analysis of the resulting product by titration revealed 0.8 mEq/g of C=C double bonds.

Example 4

Synthesis of branched alpha-omega-diacrylamide Poly(dimethylsiloxane) 4500

300 g of PDMS diacrylamide generated in Example 2 were dissolved in 500 mL of a mixture of 70% tetrahydrofuran and 30% isopropanol in a 2-L roundbottom flask equipped with magnetic stirring. 5.73 g of trimethylolpropane tris(mercaptopropionate) (Aldrich) were added and the mixture was stirred to homogenize. 5.0 mL of 0.1N NaOH in methanol (Fisher) were added and the flask was stirred overnight. The following day, the reaction mixture was sampled and titrated with 0.1N Iodine solution (Acros); 25 μL of iodine solution turned 5 mL of reaction mixture yellow, indicating the near-complete consumption of thiol. 5.0 mL of HCl in isopropanol (Fisher) were added, and the solvent was stripped on a rotary evaporator. The resulting oil was further purified by high-vacuum drying to constant weight.

Example 5

Synthesis of Semi-Telechelic Silicone Hydrogel Polymer

A 2-L jacketed reactor was equipped with a heating/chilling loop, septum inlet adapter, reflux condenser with $N_2$-inlet adapter, and overhead stirring. A solution was generated by dissolving 55.43 g of PDMS-DAm produced by the procedure described in Example 2 in 150 g of 1-propanol. This solution was charged to the reactor and cooled to 8° C. The solution was degassed by evacuating to less than 5 mBar, holding at vacuum for 15 minutes, and then re-pressurizing with dry nitrogen. This degas procedure was repeated for a total of 5 times.

In a separate 500 mL flask equipped with magnetic stirring and a vacuum-inlet adapter with valve, 5.9 g of cysteamine hydrochloride was dissolved in 300 mL of 1-propanol. In another 500 mL flask equipped with magnetic stirring and vacuum-inlet adapter with valve, a solution of 30.77 g of N,N-dimethylacrylamide (Bimax Corporation) and 7.72 g of hydroxyethyl acrylate (Aldrich) were dissolved in 300 mL of 1-propanol. In a third flask, similarly equipped, 0.18 g of azo-bis(isobutyronitrile) (Aldrich) was dissolved in 150 g of 1-propanol. All three solutions were degassed twice by evacuation to 60 mBar, holding vacuum for 5 minutes, and then re-pressurizing with nitrogen.

Under a positive flow of nitrogen, the reactor was opened and the cysteamine hydrochloride, N,N-dimethylacrylamide/hydroxyethylacrylate, and azo-bis(isobutyronitrile) solutions were charged to the reactor. Still holding at 8° C., the reactor was degassed by evacuating to less than 5 mBar and holding for 5 minutes, then re-pressurizing with nitrogen. A total of four degassing cycles were performed. The reactor was then heated to 68° C. and held at temperature under nitrogen with stirring for 16 hours. The reaction mixture was then transferred to a flask and vacuum stripped at 40° C./100 mBar on a rotary evaporator to remove 1-propanol. After the first 500 g of 1-propanol was removed, 500 g of water were added slowly with stirring to create an emulsion. The emulsion was then further stripped of 1-propanol until 200 g of distillate were collected. 200 g of water were again added back to the emulsion, and solvent-exchange was continued to collect a final 200 g of distillate. The emulsion was then diluted to 2.0 kg.

This emulsion was then charged to a 2-L reactor equipped with overhead stirring, refrigeration loop, thermometer, and the pH meter and dispensing tip of a Metrohm Model 718 STAT Titrino. The reaction mixture was then cooled to 1° C. 1.5 g of $NaHCO_3$ were charged to the emulsion and stirred to dissolve. The Titrino was set to maintain pH at 9.5 by intermittent addition of 15% sodium hydroxide solution. 6.2 mL of acryloyl chloride was then added over one hour using a syringe pump. The emulsion was stirred for another hour, then the Titrino was set to neutralize the reaction mixture by addition of a 15% solution of hydrochloric acid. The emulsion was then drained from the reactor, diluted to 3.5 L and filtered to 16 μm exclusion. The emulsion was purified by diafiltration (nominal molecular weight cut-off, 10,000 D) with deionized water until the permeate conductance was below 2.5 μS/cm, and polymer was isolated by lyophilization.

Example 6

Comparative Formulation

Polymer from Example 5 were dissolved in approximately 200 mL of 1-propanol, concentrated to ca. 70 g total solution weight, and filtered to 0.45 μm exclusion. 106.71 g of solution at 13.87% solids were recovered. 3.702 g of a 1% solution of 2-hydroxy-4'-hydroxyethyl-2-methylpropiophenone (IRGACURE®-2959, Ciba Specialty Chemicals) was added, and then the solution was concentrated to a final weight of 22.77 g (65.0% solids).

Example 7

Comparative Lens Casting

The formulation of Example 6 was used to cast lenses as follows. 200 mg of the formulation was dosed into poly (propylene) molds and the molds were closed. The molds were then irradiated for 36 sec with an ultraviolet light source having an intensity of 2.18 mW/cm$^2$. The molds were then opened, and the mold halves which had a lens attached were soaked in a mixture of 80% isopropanol, 20% water (v/v) overnight. The lenses were rinsed off the molds with this solvent mixture, then rinsed twice for 2 hrs. each in fresh aliquots of isopropanol/water mixture. The lenses were drained then hydrated by immersion in deionized water. They were then rinsed three times for 2 h apiece in pure water (3.0 mL/lens).

Example 8

Formulation of the Invention 4.0 g of formulation from Example 6 were weighed into a syringe. 0.0215 g of trimethylolpropane tris(mercaptopropionate) and 0.0486 g of 1,6-dithiohexane were added and the formulation was stirred for five minutes with a steel spatula. The formulation was then dosed into poly(propylene) molds and the molds were closed. The molds were then irradiated for 36 sec with an ultraviolet light source having an intensity of 2.18 mW/cm$^2$. The molds were then opened, and the mold halves which had a lens attached were soaked in a mixture of 80% isopropanol, 20% water (v/v) overnight. The lenses were rinsed off the molds with this solvent mixture, then rinsed twice for 2 hrs. each in fresh aliquots of isopropanol/water mixture. The lenses were drained then hydrated by immersion in deionized water. They were then rinsed three times for 2 h apiece in pure water (3.0 mL/lens).

Example 9

Synthesis of Semi-Telechelic Silicone Hydrogel Polymer

A 2-L jacketed reactor was equipped with a heating/chilling loop, septum inlet adapter, reflux condenser with N$_2$-inlet adapter, and overhead stirring. A solution was generated by dissolving 62.97 g of PDMS-DAm produced by the procedure described in Example 4 in 150 g of 1-propanol. This solution was charged to the reactor and cooled to 8° C. The solution was degassed by evacuating to less than 5 mBar, holding at vacuum for 15 minutes, and then re-pressurizing with dry nitrogen. This degas procedure was repeated for a total of 5 times.

In a separate 500 mL flask equipped with magnetic stirring and a vacuum-inlet adapter with valve, 2.72 g of cysteamine hydrochloride was dissolved in 300 mL of 1-propanol. In another 500 mL flask equipped with magnetic stirring and vacuum-inlet adapter with valve, a solution of 27.39 g of N,N-dimethylacrylamide (Bimax Corporation) and 6.84 g of hydroxyethyl acrylate (Aldrich) were dissolved in 300 mL of 1-propanol. In a third flask, similarly equipped, 0.19 g of azo-bis(isobutyronitrile) (Aldrich) was dissolved in 150 g of 1-propanol. All three solutions were degassed twice by evacuation to 60 mBar, holding vacuum for 5 minutes, and then re-pressurizing with nitrogen.

Under a positive flow of nitrogen, the reactor was opened and the cysteamine hydrochloride, N,N-dimethylacrylamide/hydroxyethylacrylate, and azo-bis(isobutyronitrile) solutions were charged to the reactor. Still holding at 8° C., the reactor was degassed by evacuating to less than 5 mBar and holding for 5 minutes, then re-pressurizing with nitrogen. A total of four degassing cycles were performed. The reactor was then heated to 68° C. and held at temperature under nitrogen with stirring for 16 hours. The reaction mixture was then transferred to a flask and vacuum stripped at 40° C./100 mBar on a rotary evaporator to remove 1-propanol. After the first 500 g of 1-propanol was removed, 500 g of water were added slowly with stirring to create an emulsion. The emulsion was then further stripped of 1-propanol until 200 g of distillate were collected. 200 g of water were again added back to the emulsion, and solvent-exchange was continued to collect a final 200 g of distillate. The emulsion was then diluted to 2.0 kg and purified by diafiltration (nominal molecular weight cut-off, 10,000 D) with deionized water until the permeate conductance was below 2.5 μS/cm. This amine-terminal polymer was isolated by lyophilization.

Approximately 50 g of the polymer was then redissolved in tetrahydrofuran, and the amine equivalence was determined by titration. 16.2 mEq of amine were found. 3.10 g of 50% NaOH (aq) were added to the solution in a roundbottom flask equipped with magnetic stirring. The contents of the flask were cooled by means of an ice bath. 2.53 g of the acid chloride synthesized in Example 1 were diluted to 25 mL with anhydrous THF. This was added dropwise to the reaction mixture over one hour. The ice bath was removed and the reaction mixture was solvent-exchanged to water by stripping 350 mL of solvent, back-adding 350 g of deionized water, and then twice more stripping 250 mL of solvent and back adding 250 mL of water, for a total of 850 mL of water. The emulsion was then diluted to 2 L and filtered to 16 μm exclusion. The emulsion was purified by diafiltration (nominal molecular weight cut-off, 10,000 D) with deionized water until the permeate conductance was below 2.5 μS/cm, and polymer was isolated by lyophilization. The polymer had 0.142 mEq/g of norbornene double bonds as determined by NMR.

Example 10

Formulation of the Invention

Polymer/Irgacure Formulation.

10.0 g of polymer from Example 9 were weighed into an amber flask. 100 g of 1-propanol were added and the flask was swirled to dissolve. The solution was filtered through a Whatman glass fiber GF/B filter paper. The solids content of the solution was measured on a halogen moisture analyzer. To the 116.32 g of solution at 8.27% solids, 2.405 g of Irgacure-2959 was added and the solution was concentrated to a total weight of 12.33 g.

Stock Solutions.

Stock solutions of 1,6-hexanedithiol and trimethylolpropane tris(mercaptopropionate) were prepared by diluting 3.912 g of 1,6-hexanedithiol and 3.559 g of trimethylolpropane tris(mercaptopropionate) respectively to 10 mL with n-methylpyrrolidone.

Lens Formulation:

65.4 µL of the 1,6-hexanedithiol stock solution, 360 µL of trimethylolpropane tris(mercaptopropionate) stock solution, and 2.4 g of 1-propanol were added to the polymer/Irgacure formulation and stirred for five minutes with a steel spatula.

Lens Preparation:

A lens formulation was then dosed into poly(propylene) molds and the molds were closed. The molds were then irradiated for 10 sec with an ultraviolet light source having an intensity of 2.18 mW/cm$^2$. The molds were then opened, and the mold halves which had a lens attached were soaked in a mixture of 80% isopropanol, 20% water (v/v) overnight. The lenses were rinsed off the molds with this solvent mixture, then rinsed twice for 2 hrs. each in fresh aliquots of isopropanol/water mixture. The lenses were drained then hydrated by immersion in deionized water. They were then rinsed three times for 2 h apiece in pure water (3.0 mL/lens).

Obtained lenses are tested for their tear resistance (manually). Results are shown in Table 1.

TABLE 1

| Example # | Cure type | Color | Tensile Properties |
|---|---|---|---|
| 7 | Free-radical propagation | Colorless | Stiff, brittle lens |
| 8 | Acrylamide thiol-ene | Slight yellow | Soft, elastic |
| 10 | Norbornene thiol-ene | Colorless | Soft, elastic lens |

Example 11

Synthesis of Semi-Telechelic Silicone Hydrogel Polymer

A 2-L jacketed reactor was equipped with a heating/chilling loop, septum inlet adapter, reflux condenser with N$_2$-inlet adapter, and overhead stirring. A solution was generated by dissolving 125.93 g of PDMS-DAm produced by the procedure described in Example 4 in 555 g of 1-propanol. This solution was charged to the reactor and cooled to 8° C. The solution was degassed by evacuating to less than 5 mBar, holding at vacuum for 15 minutes, and then re-pressurizing with dry nitrogen. This degas procedure was repeated for a total of 5 times.

In a separate 1000 mL flask equipped with magnetic stirring and a vacuum-inlet adapter with valve, 5.44 g of cysteamine hydrochloride was dissolved in 280 g of 1-propanol. In another 1000 mL flask equipped with magnetic stirring and vacuum-inlet adapter with valve, a solution of 54.79 g of N,N-dimethylacrylamide (Bimax Corporation) and 13.68 g of hydroxyethyl acrylate (Aldrich) were dissolved in 280 g of 1-propanol. In a third flask, similarly equipped, 0.37 g of azo-bis(isobutyronitrile) (Aldrich) was dissolved in 37 g of 1-propanol. All three solutions were degassed twice by evacuation to 60 mBar, holding vacuum for 5 minutes, and then re-pressurizing with nitrogen.

Under a positive flow of nitrogen, the reactor was opened and the cysteamine hydrochloride, N,N-dimethylacrylamide/hydroxyethylacrylate, and azo-bis(isobutyronitrile) solutions were charged to the reactor. Still holding at 8° C., the reactor was degassed by evacuating to less than 5 mBar and holding for 5 minutes, then re-pressurizing with nitrogen. A total of four degassing cycles were performed. The reactor was then heated to 68° C. and held at temperature under nitrogen with stirring for 16 hours. The reaction mixture was then transferred to a flask and vacuum stripped at 40° C./100 mBar on a rotary evaporator to remove 1-propanol. After the first 672 g of 1-propanol was removed, 800 g of water were added slowly with stirring to create an emulsion. The emulsion was then further stripped of 1-propanol until 769 g of distillate were collected. 800 g of water were again added back to the emulsion, and solvent-exchange was continued to collect a final 225 g of distillate. The emulsion was then diluted to 3.0 kg and purified by diafiltration (nominal molecular weight cut-off, 10,000 D) with deionized water until the permeate conductance was below 2.5 µS/cm. This amine-terminal polymer was isolated by lyophilization.

95.0 g of the polymer was then dissolved in 800 mL of anhydrous, inhibitor-free tetrahydrofuran. 20 g of magnesium sulfate were added and the flask was stirred for 30 minutes. The suspension was filtered to 1.2 µm exclusion with a glass-fiber filter paper and then titrated to measure the amine equivalence. 950 g of solution with a total equivalence of 7.5 mEq amine were recovered. 1.68 g of diazabicyclooctane (15.0 mEq) were added to the flask containing the solution and stirred to dissolve. 2.35 g of the acid chloride of Example 1 (15 mEq) were then diluted to 4 mL with anhydrous, inhibitor-free THF and added dropwise with a pipet. The flask was then equipped with a reflux condenser with N2-inlet adapter and refluxed for three hours. The reaction mixture was then diluted to 1.5 L with deionized water. THF was then removed from the solution on a rotary evaporator by stripping 500-600 mL of fluid, back-adding water, and continuing to strip distillate and back-add deionized water until an essentially aqueous emulsion remained. The emulsion was then diluted to 2.0 kg and purified by diafiltration (nominal molecular weight cut-off, 10,000 D) with deionized water until the permeate conductance was below 2.5 µS/cm and no odor of norbornene carboxylic acid was detected in the permeate. This norbornene-terminal polymer was isolated by lyophilization, and was analyzed and found to possess 0.079 mEq/g of double bonds from norbornene.

Example 12

In a 4-L beaker, 24.13 g of Na2CO3 (389 mEq), 80 g of NaCl and 1.52 kg of deionized water were mixed to dissolve. In a separate 4-L beaker, 700 g of alpha-omega-aminopropyl-polydimethylsiloaxane (Shin-Etsu manufacture, MW ca. 11500, 123 mEq) were dissolved in 1000 g of hexane. A 4-L reactor was equipped with overhead stirring with turbine agitator and a 250-mL addition funnel with micro-flow controller. The two solutions were then charged to the reactor, and mixed for 15 minutes with heavy agitation to produce an emulsion. 14.5 g of acryloyl chloride (160.2 mEq) was dissolved in 100 mL of hexane and charged to the addition funnel. The acryloyl chloride solution was added dropwise to the emulsion under heavy agitation over one hour. The emulsion was stirred for 30 minutes on completion of the addition and then agitation was stopped and the phases were allowed to separate overnight. The aqueous phase was decanted and the organic phase was washed twice with a mixture of 2.0 kg of 2.5% NaCl dissolved in water. The organic phase was then dried over magnesium sulfate, filtered to 1.0 μm exclusion, and concentrated on a rotary evaporator. The resulting oil was further purified by high-vacuum drying to constant weight. Analysis of the resulting product by titration revealed 0.175 mEq/g of C=C double bonds.

Example 13

Synthesis of Semi-Telechelic Silicone Hydrogel Polymer

A 2-L jacketed reactor was equipped with a heating/chilling loop, septum inlet adapter, reflux condenser with $N_2$-inlet adapter, and overhead stirring. A solution was generated by dissolving 54.86 g of PDMS-DAm produced by the procedure described in Example 12 and 6.24 g of the PDMS-DAm produced by Example 2 in 200 g of 1-propanol. This solution was charged to the reactor and cooled to 8° C. The solution was degassed by evacuating to less than 5 mBar, holding at vacuum for 15 minutes, and then re-pressurizing with dry nitrogen. This degas procedure was repeated for a total of 5 times.

In a separate 500 mL flask equipped with magnetic stirring and a vacuum-inlet adapter with valve, 2.84 g of cysteamine hydrochloride was dissolved in 140 g of 1-propanol. In another 500 mL flask equipped with magnetic stirring and vacuum-inlet adapter with valve, a solution of 28.84 g of N,N-dimethylacrylamide (Bimax Corporation) and 7.21 g of hydroxyethyl acrylate (Aldrich) were dissolved in 210 g of 1-propanol. In a 125 mL flask, similarly equipped, 0.14 g of azo-bis(isobutyronitrile) (Aldrich) was dissolved in 14 g of 1-propanol. And in a fourth, 100 mL flask, 0.72 g of hydroxyethyl acrylate and 2.88 g of N,N-dimethylacrylamide were dissolved in 21 g of 1-propanol. All four solutions were degassed twice by evacuation to 60 mBar, holding vacuum for 5 minutes, and then re-pressurizing with nitrogen.

Under a positive flow of nitrogen, the reactor was opened and the cysteamine hydrochloride and the larger of the two N,N-dimethylacrylamide/hydroxyethylacrylate solutions were charged to the reactor. Still holding at 8° C., the reactor was degassed by evacuating to less than 5 mBar and holding for 5 minutes, then re-pressurizing with nitrogen. A total of four degassing cycles were performed. The solution containing 0.72 g of hydroxyethyl acrylate and 2.88 g of N,N-dimethylacrylamide was charged to the reservoir of an Alltech 301 HPLC pump equipped with an Alltech 590516 in-line degassing unit. The outlet was positioned to return fluid to the reservoir, and the pump was run at a rate of 0.146 mL/min for 30 minutes to further deoxygenate the solution.

The reactor was then heated to 68° C., and the HPLC pump was stopped and its outlet affixed to drop fluid into the reaction mixture without contacting the walls of the vessel. When at temperature, the azobis(isobutyronitrile) solution was injected into the reactor with a syringe and the HPLC pump was started. The solution was dosed to the reactor over three hours, and then 10 mL of filtered propanol was run through the HPLC lines into the reactor as a rinse. The reactor was then cooled to room temperature.

The reaction mixture was then transferred to a flask and vacuum stripped at 40° C./100 mBar on a rotary evaporator to remove 1-propanol. After the first 344 g of 1-propanol was removed, 500 g of water were added slowly with stirring to create an emulsion. The emulsion was then further stripped of 1-propanol until 473 g of distillate were collected. 600 g of water were again added back to the emulsion, and solvent-exchange was continued to collect a final 150 g of distillate. The emulsion was then diluted to 2.0 kg and purified by diafiltration (nominal molecular weight cut-off, 10,000 D) with deionized water until the permeate conductance was less than 3.0 μS/cm². The material was then isolated by lyophilization.

40 g of the polymer thus produced was dissolved in approximately 400 mL of anhydrous, inhibitor-free tetrahydrofuran. 20 g of magnesium sulfate were added and the flask was stirred for 30 minutes. The suspension was filtered to 1.2 μm exclusion with a glass-fiber filter paper and then titrated to measure the amine equivalence. 398 g of solution with a total equivalence of 3.58 mEq amine were recovered. 0.80 g of diazabicyclooctane (7.16 mEq) were added to the flask containing the solution and stirred to dissolve. 1.12 g of the acid chloride of Example 1 (7.16 mEq) were then diluted to 4 mL with anhydrous, inhibitor-free THF and added dropwise with a pipet. The flask was then equipped with a reflux condenser with $N_2$-inlet adapter and refluxed for three hours. The reaction mixture was then diluted with 200 mL of deionized water. THF was then removed from the solution on a rotary evaporator by stripping 150-200 mL of fluid, back-adding water, and continuing to strip distillate and back-add deionized water until an essentially aqueous emulsion remained. The emulsion was then diluted to 2.0 kg and purified by diafiltration (nominal molecular weight cut-off, 10,000 D) with deionized water until the permeate conductance was below 2.5 μS/cm and no odor of norbornene carboxylic acid was detected in the permeate. This norbornene-terminal polymer was isolated by lyophilization, and was analyzed and found to possess 0.09 mEq/g of double bonds from norbornene.

Example 14

10 g of polymer from Example 9 were dissolved in approximately 200 mL of 1-propanol and filtered to 0.45 μm exclusion. 148.1 g of solution at 6.74% solids were recovered. 2.5 g of a 1% solution of 2-hydroxy-4'-hydroxyethyl-2-methylpropiophenone (IRGACURE®-2959, Ciba Specialty Chemicals) was added, and then the solution was concentrated to a final weight of 15.32 g (65.0% solids).

Example 15

26.22 g of polymer from Example 13 were dissolved in approximately 200 mL of 1-propanol and filtered to 0.45 μm exclusion. 187.78 g of solution at 13.65% solids were recovered. 6.45 g of a 1% solution of 2-hydroxy-4'-hydroxyethyl-2-methylpropiophenone (IRGACURE®-2959, Ciba Specialty Chemicals) was added, and then the solution was concentrated to a final weight of 36.63 g (70.0% solids).

Example 16

Approximately 75 g of polymer from Example 11 were dissolved in approximately 400 mL of 1-propanol and filtered to 0.45 μm exclusion. 435.24 g of solution at 14.24% solids were recovered. 15.5 g of a 1% solution of 2-hydroxy-4'-hydroxyethyl-2-methylpropiophenone (IRGACURE®-2959, Ciba Specialty Chemicals) was added, and then the solution was concentrated to a final weight of 95.35 g (65.0% solids).

Example 17

5.0 g of the formulation of Example 14 and 5.0 g of the formulation of Example 15 were weighed into an amber vial. 1.14 g of alpha-omega dithio(polydimethylsiloxane) (MW 3,000 D, Shin-Etsu Co.) were added and the flask was stirred with a metal spatula for 5 minutes. The formulation was transferred to dosing syringes. The formulation was then used to cast lenses as follows. 200 mg of the formulation was dosed into poly(propylene) molds and the molds were closed. The molds were then irradiated for 40 sec with an ultraviolet light source having an intensity of 1.82 mW/cm$^2$. The molds were then opened, and the mold halves which had a lens attached were soaked in a mixture of 80% isopropanol, 20% water (v/v) overnight. The lenses were rinsed off the molds with this solvent mixture, then rinsed twice for 2 hrs. each in fresh aliquots of isopropanol/water mixture. The lenses were drained then hydrated by immersion in deionized water. They were then rinsed three times for 2 h apiece in pure water (3.0 mL/lens).

Example 18

4.0 g of the formulation of Example 14 and 4.0 g of the formulation of Example 15 were weighed into an amber vial. 0.48 g of alpha-omega dithio(polydimethylsiloxane) (MW 3,000 D, Shin-Etsu Co.) and 0.634 g of Poly(dimethylsiloxane)-co-(mercaptopropyl-methysiloxane) were added and the flask was stirred with a metal spatula for 5 minutes. The formulation was transferred to dosing syringes. The formulation was then used to cast lenses as follows. 200 mg of the formulation was dosed into poly(propylene) molds and the molds were closed. The molds were then irradiated for 40 sec with an ultraviolet light source having an intensity of 1.82 mW/cm$^2$. The molds were then opened, and the mold halves which had a lens attached were soaked in a mixture of 80% isopropanol, 20% water (v/v) overnight. The lenses were rinsed off the molds with this solvent mixture, then rinsed twice for 2 hrs. each in fresh aliquots of isopropanol/water mixture. The lenses were drained then hydrated by immersion in deionized water. They were then rinsed three times for 2 h apiece in pure water (3.0 mL/lens).

Example 19

13.0 g of the formulation of Example 16 were weighed into an amber vial. 0.853 g of alpha-omega dithio(polydimethylsiloxane) (MW 3,000 D, Shin-Etsu Co.) were added and the flask was stirred with a metal spatula for 5 minutes, then rolled on a mill for 30 minutes. The formulation was transferred to dosing syringes. The formulation was then used to cast lenses as follows. 200 mg of the formulation was dosed into poly(propylene) molds and the molds were closed. The molds were then irradiated for 110 sec with an ultraviolet light source having an intensity of 1.82 mW/cm$^2$. The molds were then opened, and the lenses were rinsed off the molds with hot water.

Example 20

Attachment of Norbornene to PVA 100 grams of PVA (KL03) was dissolved in DMSO (477 grams) using a 1 liter reaction kettle with stirring. 5-Norbornene-2-carboxaldehyde (5.67 grams) was added to the solution. Concentrated HCl (37%) was added (29.3 grams) to start the modification reaction. The solution was heated to 40° C. and held for 18 hours. The solution was then cooled to room temperature. The polymer solution was added drop wise to a 10 to 15-fold excess of a 20% aqueous NaCl solution with vigorous stirring. The stirring was stopped and the PVA precipitate rose to the top of the vessel. The 20% NaCl was separated from the precipitate, then D.I. water (2.5 liters) was added to dissolve the modified PVA. The solution was filtered through a 0.45 um filter cartridge, then ultrafiltered using 1 KDa membranes. About an 8-fold volume of water passed through the membranes. The purified macromer solution was concentrated to >30% solids using a rotary evaporator.

Example 21

Preparation of Formulation and Lens Fabrication

The 30.55% aqueous solution of the purified macromer (5.89 grams), 1% Irgacure 2959 solution in water (0.36 grams), hydroxyl-TEMPO (0.0064 grams), and dithioerythritol (0.129 grams) were mixed together in a small vial.

The curing characteristics were investigated by photo-rheology. The formulations were cured using a 1.74 mW/cm$^2$ UV light source. The UV dose needed for the shear modulus to level off at 28 kPa was 31 mJ/cm$^2$. The results from this test are attached at the end of this document.

Example 22

Synthesis of Semi-Telechelic Silicone Hydrogel Polymer

A 2-L jacketed reactor was equipped with a heating/chilling loop, septum inlet adapter, reflux condenser with N2-inlet adapter, and overhead stirring. A solution was generated by dissolving 109.02 g of PDMS-DAm produced by the procedure described in Example 12 and 12.37 g of the PDMS-DAm produced by Example 2 in 200 g of 1-propanol. This solution was charged to the reactor and cooled to 8° C.

In a separate 500 mL flask equipped with magnetic stirring and a vacuum-inlet adapter with valve, 5.63 g of cysteamine hydrochloride was dissolved in 297 g of 1-propanol. In a 1-L flask equipped with magnetic stirring and vacuum-inlet adapter with valve, 50.82 g of N,N-dimethylacrylamide (Bimax Corporation), 16.55 g of hydroxyethyl acrylate (Aldrich) and 5.08 g of aminopropyl methacrylamide hydrochloride (hereafter APMA, obtained from Polysciences Corp) were dissolved in 600 g of 1-propanol. In a 125 mL flask, similarly equipped, 0.14 g of azo-bis(isobutyronitrile) (Aldrich) was dissolved in 14 g of 1-propanol. And in a fourth, 100 mL flask, 1.70 g of hydroxyethyl acrylate, 5.12 g of N,N-dimethylacrylamide, and 5.09 g of aminopropyl methacrylamide were dissolved in 60 g of dimethylsulfoxide. All four solutions were degassed twice by evacuation to 60 mBar, holding vacuum for 5 minutes, and then re-pressurizing with nitrogen.

Under a positive flow of nitrogen, the reactor was opened and the cysteamine hydrochloride and the N,N-dimethylacrylamide/hydroxyethylacrylate/aminopropyl methacrylamide hydrochloride solution in 1-propanol were charged to the reactor. Still holding at 8° C., the reactor was degassed by evacuating to less than 5 mBar and holding for 5 minutes, then re-pressurizing with nitrogen. A total of fifteen degassing cycles were performed. The dimethylsulfoxide solution containing 0.72 g of hydroxyethyl acrylate, 2.88 g of N,N-dimethylacrylamide and aminopropyl methacrylamide hydrochloride was charged to the reservoir of an Alltech 301 HPLC pump equipped with an Alltech 590516 in-line degassing unit. The outlet was positioned to return fluid to the reservoir, and the pump was run at a rate of 0.353 mL/min for 30 minutes to further deoxygenate the solution.

The reactor was then heated to 68° C., and the HPLC pump was stopped and its outlet affixed to drop fluid into the reaction mixture without contacting the walls of the vessel. When at temperature, the azobis(isobutyronitrile) solution was injected into the reactor with a syringe and the HPLC pump was started. The solution was dosed to the reactor over three hours, and then 10 mL of filtered propanol was run through the HPLC lines into the reactor as a rinse. The reactor was then cooled to room temperature.

The reaction mixture was then transferred to a flask and vacuum stripped at 40° C./100 mBar on a rotary evaporator to remove 1-propanol. After the first 344 g of 1-propanol was removed, 500 g of water were added slowly with stirring to create an emulsion. The emulsion was then further stripped of 1-propanol until 473 g of distillate were collected. 600 g of water were again added back to the emulsion, and solvent-exchange was continued to collect a final 150 g of distillate. The emulsion was then diluted to 4.0 kg.

Example 23

Acrylamide-Functional Semi-Telechelic 2.0 kg of the emulsion produced in Example 22 was charged to a 2-L reactor equipped with overhead stirring, refrigeration loop, thermometer, and the pH meter and dispensing tip of a Metrohm Model 718 STAT Titrino. The reaction mixture was then cooled to 1° C. 1.5 g of NaHCO3 were charged to the emulsion and stirred to dissolve. The Titrino was set to maintain pH at 9.5 by intermittent addition of 15% sodium hydroxide solution. 6.2 mL of acryloyl chloride was then added over one hour using a syringe pump. The emulsion was stirred for another hour, then the Titrino was set to neutralize the reaction mixture by addition of a 15% solution of hydrochloric acid. The emulsion was then drained from the reactor, diluted to 3.5 L and filtered to 16 μm exclusion. The emulsion was purified by diafiltration (nominal molecular weight cut-off, 10,000 D) with deionized water until the permeate conductance was below 2.5 μS/cm, and polymer was isolated by lyophilization. Nuclear Magnetic Resonance spectroscopy revealed 0.15 mEq/g of carbon-carbon double bonds.

Example 24

Norbornyl-Functional Semi-Telechelic

The remaining 2.0 kg of emulsion from Example 22 was purified by diafiltration (nominal molecular weight cut-off, 10,000 D) with deionized water until the permeate conductance was less than 3.0 μS/cm$^2$. The material was then isolated by lyophilization.

18 g of the polymer thus produced was dissolved in approximately 200 mL of anhydrous, inhibitor-free tetrahydrofuran. 10 g of magnesium sulfate were added and the flask was stirred for 30 minutes. The suspension was filtered to 1.2 μm exclusion with a glass-fiber filter paper and then titrated to measure the amine equivalence. 207 g of solution with a total equivalence of 2.78 mEq amine were recovered. 1.56 g of diazabicyclooctane (13.9 mEq) were added to the flask containing the solution and stirred to dissolve. 2.18 g of the acid chloride of Example 1 (13.9 mEq) were then diluted to 4 mL with anhydrous, inhibitor-free THF and added dropwise with a pipet. The flask was then equipped with a reflux condenser with N2-inlet adapter and refluxed for three hours. The reaction mixture was then diluted with 200 mL of deionized water. THF was then removed from the solution on a rotary evaporator by stripping 150-200 mL of fluid, back-adding water, and continuing to strip distillate and back-add deionized water until an essentially aqueous emulsion remained. The emulsion was then diluted to 2.0 kg and brought to alkaline pH by addition of 30 mL of 50% aqueous potassium hydroxide. This emulsion was stirred overnight, then ultrafiltered (nominal molecular weight cut-off, 10,000 D) with deionized water until the permeate conductance was below 70 μS/cm. The sample was then diafiltered with 10% isopropanol in water, and finally ultrafiltered with a further 60 L of water until no odor of norbornene carboxylic acid was detected in the permeate. This norbornene-terminal polymer was isolated by lyophilization, and was analyzed and found to possess 0.159 mEq/g of double bonds from norbornene.

Example 25

Comparative Formulation

Free-Radical Curing 30.0 g of polymer from Example 23 was combined with 7.5 g of a 1% solution (80% 1-Propanol/20% tetrahydrofuran by weight) of 2-hydroxy-4'-hydroxyethyl-2-methylpropiophenone (IRGACURE®-2959, Ciba Specialty Chemicals) and a further 8.64 g of solvent mixture in an amber glass vial and rolled until completely homogeneous.

Example 26

Formulation of the Invention

25% Hybrid Curing 4.93 g of formulation from Example 25 (0.481 mEq vinyl) were weighed into a syringe. 0.1895 g of dithiol-terminated poly(dimethylsiloxane) with molecular weight 3000 (0.120 mEq thiol) were added and the formulation was stirred for five minutes with a steel spatula, then rolled for one hour.

Example 27

Formulation of the Invention

50% Hybrid Curing 4.79 g of formulation from Example 25 (0.467 mEq vinyl) were weighed into a vial. 0.368 g of dithiol-terminated poly(dimethylsiloxane) with molecular weight 3000 (0.234 mEq thiol) were added and the formulation was stirred for five minutes with a steel spatula, then rolled for one hour.

Example 28

Formulation of the Invention

Full Thiol-Ene Curing 10.0 g of polymer from Example 23 was combined with 2.5 g of a 1% solution (80% 1-Propanol/20% tetrahydrofuran by weight) of 2-hydroxy-4'-hydroxyethyl-2-methylpropiophenone (IRGACURE®-2959, Ciba Specialty Chemicals) and a further 2.88 g of solvent mixture in an amber glass vial and rolled until completely homogeneous. 3.098 g of this formulation (0.32 mEq vinyl) were weighed into a new amber vial. 0.505 g of dithiol-terminated poly(dimethylsiloxane) with molecular weight 3000 (0.32 mEq thiol) were added and the formulation was stirred for five minutes with a steel spatula, then rolled for one hour.

Lens Fabrication:

The formulations of Examples 25-28 were dosed into poly(propylene) molds and the molds were closed. The molds were then irradiated for times indicated in the table with an ultraviolet light source having an intensity of 4 mW/cm$^2$. The molds were then opened, and the mold halves which had a lens attached were rinsed with ethanol to remove the lenses. The lenses were then hydrated by immersion in deionized water, transferred to autoclave vials and immersed phosphate buffered saline and autoclaved. The moduli of the lenses were measured on an Instron tensile testing apparatus:

| Example | % Thiol-ene | Exposure | Modulus |
|---------|-------------|----------|---------|
| 25 | 0 | 16 sec | N/A |
| 26 | 25 | 13 sec | 1.61 MPa |
| 27 | 50 | 20 sec | 1.44 MPa |
| 28 | 100 | 20 sec | 0.79 MPa |

As can be seen, increasing the amount of step-growth curing relative to free-radical curing dramatically increases the softness of the lens, as seen by lower modulus.

What is claimed is:

1. A method for producing silicone hydrogel contact lenses, comprising the steps of:
   (1) obtaining a fluid composition, wherein the composition comprises at least one prepolymer having multiple cinnamic acid moieties of formula (IV) or dialkylmaleimide groups of formula (V) each capable of undergoing photo-induced step-growth polymerization that is 2+2 cycloaddition to form a silicone hydrogel material,

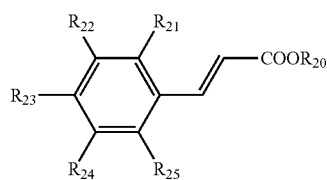

(IV)

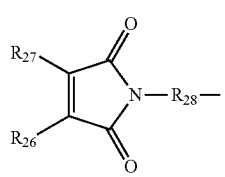

(V)

in which
R$_{20}$ is C$_1$-C$_{10}$ alkene divalent radical, R$_{21}$ and R$_{25}$ independent each other are hydrogen, C$_1$-C$_{10}$ alkyl or —NO$_2$ provided that either R$_{21}$ or R$_{25}$ is —NO$_2$, R$_{22}$-R$_{24}$ independent of one another are hydrogen or C$_1$-C$_{10}$ alkyl; R$_{26}$ and R$_{27}$, independent of each other, are C$_1$-C$_{10}$ alkyl and R$_{28}$ is a C$_1$-C$_{10}$ alkene divalent radical;
wherein the prepolymer is obtained from a siloxane-containing copolymer with pendant or terminal functional groups by covalently attaching the cinnamic acid moieties of formula (IV) or dialkylmaleimide groups of formula (V) to the pendant or terminal functional groups of the copolymer;
   (2) introducing the fluid composition into a cavity formed by a mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; and
   (3) actinically irradiating the composition in the mold to crosslink said at least one prepolymer to form a silicone hydrogel contact lens by 2+2 cycloaddition.

2. The method of claim 1, wherein the prepolymer comprises multiple cinnamic acid moieties of formula (IV)

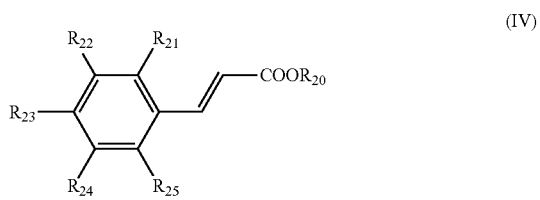

(IV)

in which
R$_{20}$ is C$_1$-C$_{10}$ alkene divalent radical, R$_{21}$ and R$_{25}$ independent each other are hydrogen, C$_1$-C$_{10}$ alkyl or —NO$_2$ provided that either R$_{21}$ or R$_{25}$ is —NO$_2$, R$_{22}$-R$_{24}$ independent of one another are hydrogen or C$_1$-C$_{10}$ alkyl.

3. The method of claim 1, wherein the prepolymer comprises multiple dialkylmaleimide groups of formula (V),

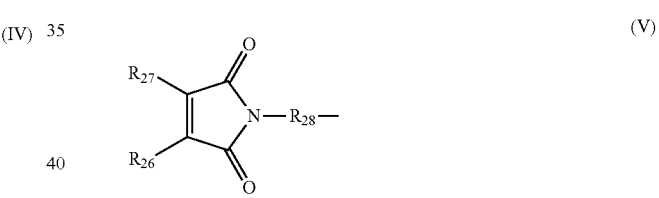

(V)

in which R$_{26}$ and R$_{27}$, independent of each other, are hydrogen or C$_1$-C$_{10}$ alkyl and R$_{28}$ is a C$_1$-C$_{10}$ alkene divalent radical.

4. The method of claim 1, wherein the mold is a reusable mold.

5. The method of claim 4, wherein the step (3) is performed by means of a spatial limitation of actinic radiation to crosslink the prepolymer.

6. A prepolymer suitable for making soft silicone hydrogel contact lenses, comprising: multiple cinnamic acid moieties of formula (IV) or multiple dialkylmaleimide groups of formula (V),

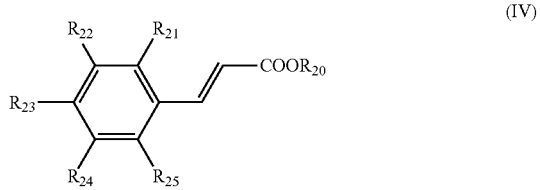

(IV)

-continued

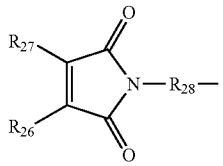

(V)

in which $R_{20}$ is $C_1$-$C_{10}$ alkene divalent radical, $R_{21}$ and $R_{25}$ independent each other are hydrogen, $C_1$-$C_{10}$ alkyl or —$NO_2$ provided that either $R_{21}$ or $R_{25}$ is —$NO_2$, $R_{22}$-$R_{24}$ independent of one another are hydrogen or $C_1$-$C_{10}$ alkyl $R_{26}$ and $R_{27}$, independent of each other, are $C_1$-$C_{10}$ alkyl and $R_{28}$ is a $C_1$-$C_{10}$ alkene divalent radical;

wherein the prepolymer is obtained from a copolymer with pendant or terminal functional groups by covalently attaching cinnamic acid moieties of formula (IV) or dialkylmaleimide groups of formula (V) to the copolymer through the pendant or terminal functional groups, wherein the copolymer with pendant or terminal functional groups comprises at least one siloxane units, wherein the functional group is selected from the group consisting of hydroxyl groups (—OH), primary amino groups (—$NH_2$), secondary amino groups (—NHR), carboxylic groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof;

wherein the prepolymer is capable of being crosslinked under actinic irradiation to form a silicone hydrogel material in the presence of or in the absence of a step-growth-propagating agent and in the absence of any vinylic monomer and/or any compound having from two to eight acryloyl or methacryloyl groups and having a molecular weight of less than 700 Daltons.

7. The prepolymer of claim 6, wherein the copolymer with pendant or terminal functional groups is obtained by copolymerization of a composition comprising
(1) at least one hydrophilic vinylic monomer,
(2) at least one silicone-containing monomer having one ethylenically unsaturated double bond, at least one siloxane-containing macromer having one ethylenically unsaturated double bond, at least one siloxane-containing macromer having two or more ethylenically unsaturated double bonds, a polysiloxane having two or more ethylenically unsaturated double bonds, a polysiloxane/perfluoroalkyl polyether block copolymer having two or more ethylenically unsaturated double bonds, or a combination of two or more thereof,
(3) optionally at least one hydrophobic vinylic monomer; and
(4) optionally one or more hydrophilic prepolymers having multiple acryloyl or methacryloyl groups, provided that at least one of components (1)-(4) further comprises at least one functional group through which a cinnamic acid moiety or a dialkylmaleimide group can be covalently linked to the obtained copolymer.

8. The prepolymer of claim 6, wherein the copolymer with pendant or terminal functional groups is obtained by copolymerization of a composition comprising
(1) at least one hydrophilic vinylic monomer,
(2) at least one silicone-containing monomer having one ethylenically unsaturated double bond, at least one siloxane-containing macromer having one ethylenically unsaturated double bond, at least one siloxane-containing macromer having two or more ethylenically unsaturated double bonds, a polysiloxane having two or more ethylenically unsaturated double bonds, a polysiloxane/perfluoroalkyl polyether block copolymer two or more ethylenically unsaturated double bonds, or a combination of two or more thereof,
(3) optionally at least one hydrophobic vinylic monomer;
(4) optionally one or more hydrophilic prepolymers having multiple acryloyl or methacryloyl groups, and
(5) at least one chain transfer agent having a functional group through which a cinnamic acid moiety or a dialkylmaleimide group can be covalently linked to the obtained copolymer.

9. The prepolymer of claim 6, wherein the copolymer is a copolymerization product of a polymerizable composition comprising
(a) at least one fluorine-containing vinylic monomer,
(b) at least one hydrophilic vinylic monomer,
(c) at least one functionalizing vinylic monomer containing at least one functional group through which a cinnamic acid moiety or a dialkylmaleimide group can be covalently linked to the obtained copolymer, and
(d) at least one silicone-containing monomer having one ethylenically unsaturated double bond, at least one siloxane-containing macromer having one ethylenically unsaturated double bond, at least one siloxane-containing macromer having two or more ethylenically unsaturated double bonds, a polysiloxane having two or more ethylenically unsaturated double bonds, a polysiloxane/perfluoroalkyl polyether block copolymer two or more ethylenically unsaturated double bonds, or a combination of two or more thereof.

10. The prepolymer of claim 6, wherein the copolymer is a copolymerization product of a polymerizable composition comprising
(a) at least one fluorine-containing vinylic monomer,
(b) at least one hydrophilic vinylic monomer,
(c) at least one silicone-containing monomer having one ethylenically unsaturated double bond, at least one siloxane-containing macromer having one ethylenically unsaturated double bond, at least one siloxane-containing macromer having two or more ethylenically unsaturated double bonds, a polysiloxane having two or more ethylenically unsaturated double bonds, a polysiloxane/perfluoroalkyl polyether block copolymer two or more ethylenically unsaturated double bonds, or a combination of two or more thereof, and
(d) at least one chain transfer agent having a functional group through which a cinnamic acid moiety or a dialkylmaleimide group can be covalently linked to the obtained copolymer.

* * * * *